United States Patent
Hendry et al.

(10) Patent No.: US 12,328,440 B2
(45) Date of Patent: Jun. 10, 2025

(54) METHOD AND APPARATUS FOR ENCODING/DECODING IMAGE ON BASIS OF CPI SEI MESSAGE, AND RECORDING MEDIUM HAVING BITSTREAM STORED THEREIN

(71) Applicant: LG ELECTRONICS INC., Seoul (KR)

(72) Inventors: Hendry Hendry, Seoul (KR); Hyeong Moon Jang, Seoul (KR); Jaehyun Lim, Seoul (KR); Seung Hwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 133 days.

(21) Appl. No.: 18/021,599

(22) PCT Filed: Aug. 19, 2021

(86) PCT No.: PCT/KR2021/011013
§ 371 (c)(1),
(2) Date: Feb. 16, 2023

(87) PCT Pub. No.: WO2022/039513
PCT Pub. Date: Feb. 24, 2022

(65) Prior Publication Data
US 2023/0308674 A1 Sep. 28, 2023

Related U.S. Application Data

(60) Provisional application No. 63/069,739, filed on Aug. 25, 2020, provisional application No. 63/068,359, (Continued)

(51) Int. Cl.
*H04N 19/46* (2014.01)
*H04N 19/172* (2014.01)
(Continued)

(52) U.S. Cl.
CPC .......... *H04N 19/46* (2014.11); *H04N 19/172* (2014.11); *H04N 19/167* (2014.11);
(Continued)

(58) Field of Classification Search
CPC .... H04N 19/46; H04N 19/172; H04N 19/167; H04N 19/33; H04N 19/174; H04N 19/61; H04N 19/30; H04N 19/597; H04N 19/70
(Continued)

(56) References Cited

U.S. PATENT DOCUMENTS 9,420,310 B2 * 8/2016 Tian ...................... H04N 19/597
9,906,807 B2 * 2/2018 Denoual ............... H04N 21/236
(Continued)

FOREIGN PATENT DOCUMENTS

| KR | 10-2020-0005439 A | 1/2020 |
| KR | 10-2020-0077517 A | 6/2020 |
| WO | 2020/141248 A1 | 7/2020 |

OTHER PUBLICATIONS

"AHG9/AHG12: Recommended multi-layer composite picture SEI messages", Joint Video Experts Team (JVET) of ITU-T SG 16 WP 3 and ISO/IEC JTC 1/SC 29/WG 11, 19th Meeting: by teleconference, Jun. 22-Jul. 1, 2020, Document: JVET-S0107, pp. 1-7 (Year: 2020).*
(Continued)

*Primary Examiner* — Christopher S Kelley
*Assistant Examiner* — Asmamaw G Tarko
(74) *Attorney, Agent, or Firm* — Bryan Cave Leighton Paisner LLP

(57) ABSTRACT

An image encoding/decoding method and apparatus are provided. The image encoding method comprises deriving information for a composite picture generated from one or more source pictures and generating a bitstream by encoding a single composite picture information (CPI) supplemental enhancement information (SEI) message including the information for the composite picture. The composite picture may comprise one or more patches obtained from the source pictures, the information for the composite picture may
(Continued)

comprise first information for a source area corresponding to each of the patches in the source pictures and second information for a patch area covered by each of the patches in the composite picture, and each layer including the source pictures may be an output layer.

15 Claims, 14 Drawing Sheets

Related U.S. Application Data filed on Aug. 20, 2020, provisional application No. 63/067,340, filed on Aug. 19, 2020, provisional application No. 63/067,836, filed on Aug. 19, 2020.

(51) Int. Cl.

| | | |
|---|---|---|
| H04N 19/167 | (2014.01) | |
| H04N 19/174 | (2014.01) | |
| H04N 19/30 | (2014.01) | |
| H04N 19/33 | (2014.01) | |
| H04N 19/597 | (2014.01) | |
| H04N 19/61 | (2014.01) | |
| H04N 19/70 | (2014.01) | |

(52) U.S. Cl.
CPC ............ *H04N 19/174* (2014.11); *H04N 19/30* (2014.11); *H04N 19/33* (2014.11); *H04N 19/597* (2014.11); *H04N 19/61* (2014.11); *H04N 19/70* (2014.11)

(58) Field of Classification Search
USPC .............................................. 375/240, 240.26
See application file for complete search history.

(56) References Cited

U.S. PATENT DOCUMENTS

| | | | | |
|---|---|---|---|---|
| 10,123,027 | B2 * | 11/2018 | Hannuksela | H04N 13/161 |
| 10,595,062 | B2 * | 3/2020 | Maze | H04N 19/176 |
| 10,645,379 | B2 * | 5/2020 | Maze | H04N 19/102 |
| 12,069,302 | B2 * | 8/2024 | Boyce | H04N 19/167 |
| 2020/0014907 | A1 * | 1/2020 | Lee | H04N 21/84 |
| 2022/0217391 | A1 * | 7/2022 | Wang | H04N 19/172 |
| 2022/0217412 | A1 * | 7/2022 | Wang | H04N 19/70 |
| 2023/0247222 | A1 * | 8/2023 | Boyce | G06V 10/764 |
| | | | | 375/240.12 |

OTHER PUBLICATIONS

Jill Boyce, "AHG9/AHG12: Recommended multi-layer composite picture SEI messages", JVET-S0107, Joint Video Experts Team (JVET) of ITU-T SG 16 WP 3 and ISO/IEC JTC 1/SC 29/WG 11, 19th Meeting: by teleconference, pp. 1-7, Jun. 22-Jul. 1, 2020, see pp. 1-6.

Sachin Deshpande, "AHG9: A Summary of Proposals Related to HRD", JVET-S0141-v4, Joint Video Experts Team (JVET) of ITU-T SG 16 WP 3 and ISO/IEC JTC 1/SC 29/WG 11, 19th Meeting: by teleconference, pp. 1-19, Jun. 22-Jul. 1, 2020, see pp. 8-9.

* cited by examiner

FIG. 8

| composite_picture_info( ) { | Descriptor |
|---|---|
| cpi_width_in_luma_samples | ue(v) |
| cpi_height_in_luma_samples | ue(v) |
| cpi_num_patches_minus1 | ue(v) |
| cpi_scaling_allowed_flag | u(1) |
| cpi_gap_allowed_flag | u(1) |
| for ( i = 0; i <= cpi_num_patches_minus1; i++ ) { | |
|    cpi_patch_layer_id[ i ] | u(6) |
|    cpi_patch_source_top_left_x[ i ] | ue(v) |
|    cpi_patch_source_top_left_y[ i ] | ue(v) |
|    cpi_patch_source_luma_width_minus1[ i ] | ue(v) |
|    cpi_patch_source_luma_height_minus1[ i ] | ue(v) |
|    cpi_patch_dest_top_left_x[ i ] | ue(v) |
|    cpi_patch_dest_top_left_y[ i ] | ue(v) |
|    if( cpi_scaling_allowed_flag) { | |
|      cpi_patch_dest_luma_width_minus1[ i ] | ue(v) |
|      cpi_patch_dest_luma_height_minus1[ i ] | ue(v) |
|    } | |
|   } | |
| } | |

FIG. 9

| composite_picture_info( ) { | Descriptor |
|---|---|
| cpi_position_and_size_bit_len_minus1 | ue(v) |
| cpi_width_in_luma_samples | u(v) |
| cpi_height_in_luma_samples | u(v) |
| cpi_num_patches_minus1 | ue(v) |
| cpi_scaling_allowed_flag | u(1) |
| cpi_gap_allowed_flag | u(1) |
| for ( i = 0; i <= cpi_num_patches_minus1; i++ ) { | |
|    cpi_patch_layer_id[ i ] | u(6) |
|    cpi_patch_source_top_left_x[ i ] | u(v) |
|    cpi_patch_source_top_left_y[ i ] | u(v) |
|    cpi_patch_source_luma_width_minus1[ i ] | u(v) |
|    cpi_patch_source_luma_height_minus1[ i ] | u(v) |
|    cpi_patch_dest_top_left_x[ i ] | u(v) |
|    cpi_patch_dest_top_left_y[ i ] | u(v) |
|    if( cpi_scaling_allowed_flag) { | |
|      cpi_patch_dest_luma_width_minus1[ i ] | u(v) |
|      cpi_patch_dest_luma_height_minus1[ i ] | u(v) |
|    } | |
|   } | |
| } | |

FIG. 10

| composite_picture_info( ) { | Descriptor |
|---|---|
|   cpi_position_and_size_bit_len_ninus1 | ue(v) |
|   cpi_unit_size | u(v) |
|   cpi_width_in_luma_samples | u(v) |
|   cpi_height_in_luma_samples | u(v) |
|   cpi_num_patches_minus1 | ue(v) |
|   cpi_scaling_allowed_flag | u(1) |
|   cpi_gap_allowed_flag | u(1) |
|   for ( i = 0; i <= cpi_num_patches_minus1; i++ ) { | |
|     cpi_patch_layer_id[ i ] | u(6) |
|     cpi_patch_source_top_left_x[ i ] | u(v) |
|     cpi_patch_source_top_left_y[ i ] | u(v) |
|     cpi_patch_source_luma_width_minus1[ i ] | u(v) |
|     cpi_patch_source_luma_height_minus1[ i ] | u(v) |
|     cpi_patch_dest_top_left_x[ i ] | u(v) |
|     cpi_patch_dest_top_left_y[ i ] | u(v) |
|     if( cpi_scaling_allowed_flag) { | |
|       cpi_patch_dest_luma_width_minus1[ i ] | u(v) |
|       cpi_patch_dest_luma_height_minus1[ i ] | u(v) |
|     } | |
|   } | |
| } | |

FIG. 11

| composite_picture_info( ) { | Descriptor |
|---|---|
|   cpi_num_patches_minus1 | ue(v) |
|   cpi_scaling_allowed_flag | u(1) |
|   cpi_gap_allowed_flag | u(1) |
|   for ( i = 0; i <= cpi_num_patches_minus1; i++ ) { | |
|     cpi_patch_layer_id[ i ] | u(6) |
|     cpi_patch_source_top_left_x[ i ] | ue(v) |
|     cpi_patch_source_top_left_y[ i ] | ue(v) |
|     cpi_patch_source_luma_width_minus1[ i ] | ue(v) |
|     cpi_patch_source_luma_height_minus1[ i ] | ue(v) |
|     cpi_patch_dest_top_left_x[ i ] | ue(v) |
|     cpi_patch_dest_top_left_y[ i ] | ue(v) |
|     if( cpi_scaling_allowed_flag) { | |
|       cpi_patch_dest_luma_width_minus1[ i ] | ue(v) |
|       cpi_patch_dest_luma_height_minus1[ i ] | ue(v) |
|     } | |
|   } | |
| } | |

FIG. 12

| composite_picture_info( ) { | Descriptor |
|---|---|
| cpi_width_in_luma_samples | ue(v) |
| cpi_height_in_luma_samples | ue(v) |
| cpi_num_patches_minus1 | ue(v) |
| cpi_cropped_source_area_allowed_flag | u(1) |
| cpi_scaling_allowed_flag | u(1) |
| cpi_gap_allowed_flag | u(1) |
| for ( i = 0; i <= cpi_num_patches_minus1; i++ ) { | |
|   cpi_patch_layer_id[ i ] | u(6) |
|   if( cpi_cropped_source_area_allowed_flag ) { | |
|     cpi_patch_source_top_left_x[ i ] | ue(v) |
|     cpi_patch_source_top_left_y[ i ] | ue(v) |
|   } | |
|   cpi_patch_source_luma_width_minus1[ i ] | ue(v) |
|   cpi_patch_source_luma_height_minus1[ i ] | ue(v) |
|   cpi_patch_dest_top_left_x[ i ] | ue(v) |
|   cpi_patch_dest_top_left_y[ i ] | ue(v) |
|   if( cpi_scaling_allowed_flag) { | |
|     cpi_patch_dest_luma_width_minus1[ i ] | ue(v) |
|     cpi_patch_dest_luma_height_minus1[ i ] | ue(v) |
|   } | |
| } | |
| } | |

FIG. 13

| composite_picture_info( ) { | Descriptor |
|---|---|
| cpi_width_in_luma_samples | ue(v) |
| cpi_height_in_luma_samples | ue(v) |
| cpi_num_patches_minus1 | ue(v) |
| cpi_cropped_source_area_allowed_flag | u(1) |
| cpi_scaling_allowed_flag | u(1) |
| cpi_gap_allowed_flag | u(1) |
| for ( i = 0; i <= cpi_num_patches_minus1; i++ ) { | |
|   cpi_patch_layer_id[ i ] | u(6) |
|   if( cpi_cropped_source_area_allowed_flag ) { | |
|     cpi_patch_source_top_left_x[ i ] | ue(v) |
|     cpi_patch_source_top_left_y[ i ] | ue(v) |
|     cpi_patch_source_luma_width_minus1[ i ] | ue(v) |
|     cpi_patch_source_luma_height_minus1[ i ] | ue(v) |
|   } | |
|   cpi_patch_dest_top_left_x[ i ] | ue(v) |
|   cpi_patch_dest_top_left_y[ i ] | ue(v) |
|   if( cpi_scaling_allowed_flag) { | |
|     cpi_patch_dest_luma_width_minus1[ i ] | ue(v) |
|     cpi_patch_dest_luma_height_minus1[ i ] | ue(v) |
|   } | |
| } | |
| } | |

METHOD AND APPARATUS FOR ENCODING/DECODING IMAGE ON BASIS OF CPI SEI MESSAGE, AND RECORDING MEDIUM HAVING BITSTREAM STORED THEREIN

CROSS-REFERENCE TO RELATED APPLICATIONS

This application is the National Stage filing under 35 U.S.C. 371 of International Application No. PCT/KR2021/011013, filed on Aug. 19, 2021, which claims the benefit of and priority to U.S. Provisional Application No. 63/067,340, filed on Aug. 19, 2020, U.S. Provisional Application No. 63/067,836, filed on Aug. 19, 2020, U.S. Provisional Application No. 63/068,359, filed on Aug. 20, 2020 and U.S. Provisional Application No. 63/069,739, filed on Aug. 25, 2020, the entire contents of which are incorporated herein for all purposes by this reference.

TECHNICAL FIELD

The present disclosure relates to an image encoding/decoding method and apparatus and a recording medium storing a bitstream, and, more particularly, to an image encoding and decoding method and apparatus based on a CPI SEI message, and a recording medium storing bitstream generated by the image encoding method/apparatus of the present disclosure.

BACKGROUND

Recently, demand for high-resolution and high-quality images such as high definition (HD) images and ultra high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost.

Accordingly, there is a need for high-efficient image compression technology for effectively transmitting, storing and reproducing information on high-resolution and high-quality images.

SUMMARY

An object of the present disclosure is to provide an image encoding/decoding method and apparatus with improved encoding/decoding efficiency.

In addition, an object of the present disclosure is to provide an image encoding/decoding method and apparatus based on a single CPI SEI message including information on a composite picture.

In addition, an object of the present disclosure is to provide an image encoding/decoding method and apparatus based on a CPI SEI message applied only to an output layer.

In addition, an object of the present disclosure is to provide an image encoding/decoding method and apparatus based on a CPI SEI message applied to both a multi-layer structure and a single-layer structure.

In addition, an object of the present disclosure is to provide an image encoding/decoding method and apparatus based on a CPI SEI message supporting a gap and overlap between patches.

Another object of the present disclosure is to provide a non-transitory computer-readable recording medium storing a bitstream generated by an image encoding method or apparatus according to the present disclosure.

Another object of the present disclosure is to provide a non-transitory computer-readable recording medium storing a bitstream received, decoded and used to reconstruct an image by an image decoding apparatus according to the present disclosure.

Another object of the present disclosure is to provide a method of transmitting a bitstream generated by an image encoding method or apparatus according to the present disclosure.

The technical problems solved by the present disclosure are not limited to the above technical problems and other technical problems which are not described herein will become apparent to those skilled in the art from the following description.

An image encoding method according to an aspect of the present disclosure comprises deriving information for a composite picture generated from one or more source pictures, and generating a bitstream by encoding a single composite picture information (CPI) supplemental enhancement information (SEI) message including the information for the composite picture. The composite picture may comprise one or more patches obtained from the source pictures, the information for the composite picture may comprise first information for a source area corresponding to each of the patches in the source pictures and second information for a patch area covered by each of the patches in the composite picture, and each layer including the source pictures may be an output layer.

An image encoding apparatus according to another aspect of the present disclosure comprises a memory and at least one processor. The at least one processor may derive information for a composite picture generated from one or more source pictures, and generate a bitstream by encoding a single composite picture information (CPI) supplemental enhancement information (SEI) message including the information for the composite picture. The composite picture may comprise one or more patches obtained from the source pictures, the information for the composite picture may comprise first information for a source area corresponding to each of the patches in the source pictures and second information for a patch area covered by each of the patches in the composite picture, and each layer including the source pictures may be an output layer.

An image decoding method according to another aspect of the present disclosure comprises obtaining information for a composite picture from a single composite picture information (CPI) supplemental enhancement information (SEI) message, and generating the composite picture from one or more source pictures based on the information for the composite picture. The composite picture may comprise one or more patches obtained from the source pictures. The information for the composite picture comprises first information for a source area corresponding to each of the patches in the source pictures and second information for a patch area covered by each of the patches in the composite picture, and each layer including the source pictures may be an output layer.

Also, a computer-readable recording medium according to another aspect of the present disclosure may store a bitstream generated by an image encoding method or apparatus according to the present disclosure.

Also, a transmission method according to another aspect of the present disclosure comprises transmitting a bitstream generated by an image encoding apparatus or method according to the present disclosure.

The features briefly summarized above with respect to the present disclosure are merely exemplary aspects of the detailed description below of the present disclosure, and do not limit the scope of the present disclosure.

According to the present disclosure, it is possible to provide an image encoding/decoding method and apparatus with improved encoding/decoding efficiency.

In addition, according to the present disclosure, it is possible to provide an image encoding/decoding method and apparatus based on a single CPI SEI message including information on a composite picture.

In addition, according to the present disclosure, it is possible to provide an image encoding/decoding method and apparatus based on a CPI SEI message applied only to an output layer.

In addition, according to the present disclosure, it is possible to provide an image encoding/decoding method and apparatus based on a CPI SEI message applied to both a multi-layer structure and a single-layer structure.

In addition, according to the present disclosure, it is possible to provide an image encoding/decoding method and apparatus based on a CPI SEI message supporting a gap and overlap between patches.

Also, according to the present disclosure, it is possible to provide a recording medium storing a bitstream generated by an image encoding method or apparatus according to the present disclosure.

Also, according to the present disclosure, it is possible to provide a recording medium storing a bitstream received, decoded and used to reconstruct an image by an image decoding apparatus according to the present disclosure.

Also, according to the present disclosure, it is possible to provide a method of transmitting a bitstream generated by an image encoding method or apparatus according to the present disclosure.

It will be appreciated by persons skilled in the art that that the effects that can be achieved through the present disclosure are not limited to what has been particularly described hereinabove and other advantages of the present disclosure will be more clearly understood from the detailed description.

BRIEF DESCRIPTION OF THE DRAWINGS

FIGS. 8 to 10 are views illustrating a syntax structure of a CPI SEI message according to an embodiment of the present disclosure.

FIGS. 8 to 13 are views illustrating a syntax structure of a CPI SEI message according to another embodiment of the present disclosure.

DETAILED DESCRIPTION

Figure 1:
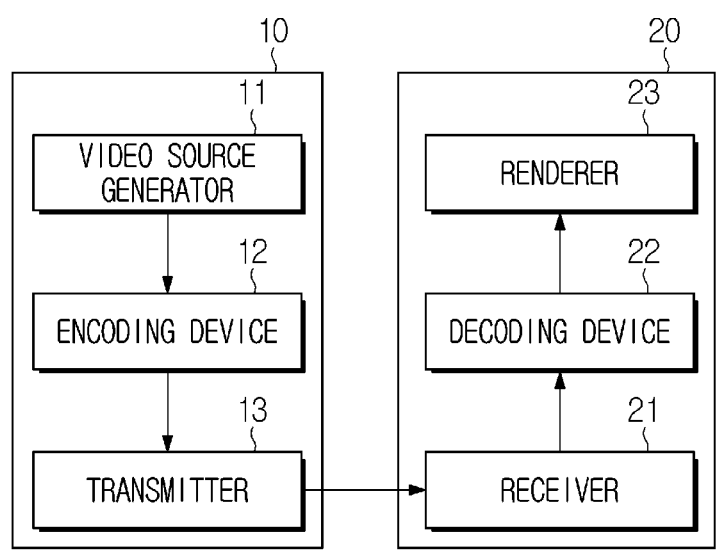
FIG. 1 is a view schematically showing a video coding system, to which an embodiment of the present disclosure is applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

In the present disclosure, a "picture" generally refers to a unit representing one image in a specific time period, and a slice/tile is a coding unit constituting a part of a picture, and one picture may be composed of one or more slices/tiles. In addition, a slice/tile may include one or more coding tree units (CTUs).

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. The unit may be used interchangeably with terms such as "sample array", "block" or "area" in some cases. In a general case, an M×N block may include samples (or sample arrays) or a set (or array) of transform coefficients of M columns and N rows.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In addition, in the present disclosure, a "current block" may mean a block including both a luma component block and a chroma component block or "a luma block of a current block" unless explicitly stated as a chroma block. The luma component block of the current block may be expressed by including an explicit description of a luma component block such as "luma block" or "current luma block. In addition, the "chroma component block of the current block" may be expressed by including an explicit description of a chroma component block, such as "chroma block" or "current chroma block".

In the present disclosure, the term "/" and "," should be interpreted to indicate "and/or." For instance, the expression "A/B" and "A, B" may mean "A and/or B." Further, "A/B/C" and "A/B/C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

Overview of Video Coding System

FIG. 1 is a view showing a video coding system to which an embodiment of the present disclosure is applicable.

The video coding system according to an embodiment may include an encoding device 10 and a decoding device 20. The encoding device 10 may deliver encoded video and/or image information or data to the decoding device 20 in the form of a file or streaming via a digital storage medium or network.

The encoding device 10 according to an embodiment may include a video source generator 11, an encoding unit 12 and a transmitter 13. The decoding device 20 according to an embodiment may include a receiver 21, a decoding unit 22 and a renderer 23. The encoding unit 12 may be called a video/image encoding unit, and the decoding unit 22 may be called a video/image decoding unit. The transmitter 13 may be included in the encoding unit 12. The receiver 21 may be included in the decoding unit 22. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding unit 12 may encode an input video/image. The encoding unit 12 may perform a series of procedures such as prediction, transform, and quantization for compression and coding efficiency. The encoding unit 12 may output encoded data (encoded video/image information) in the form of a bitstream.

The transmitter 13 may transmit the encoded video/image information or data output in the form of a bitstream to the receiver 21 of the decoding device 20 through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The receiver 21 may extract/receive the bitstream from the storage medium or network and transmit the bitstream to the decoding unit 22.

The decoding unit 22 may decode the video/image by performing a series of procedures such as dequantization, inverse transform, and prediction corresponding to the operation of the encoding unit 12.

The renderer 23 may render the decoded video/image. The rendered video/image may be displayed through the display.

Overview of Image Encoding Apparatus

Figure 2:
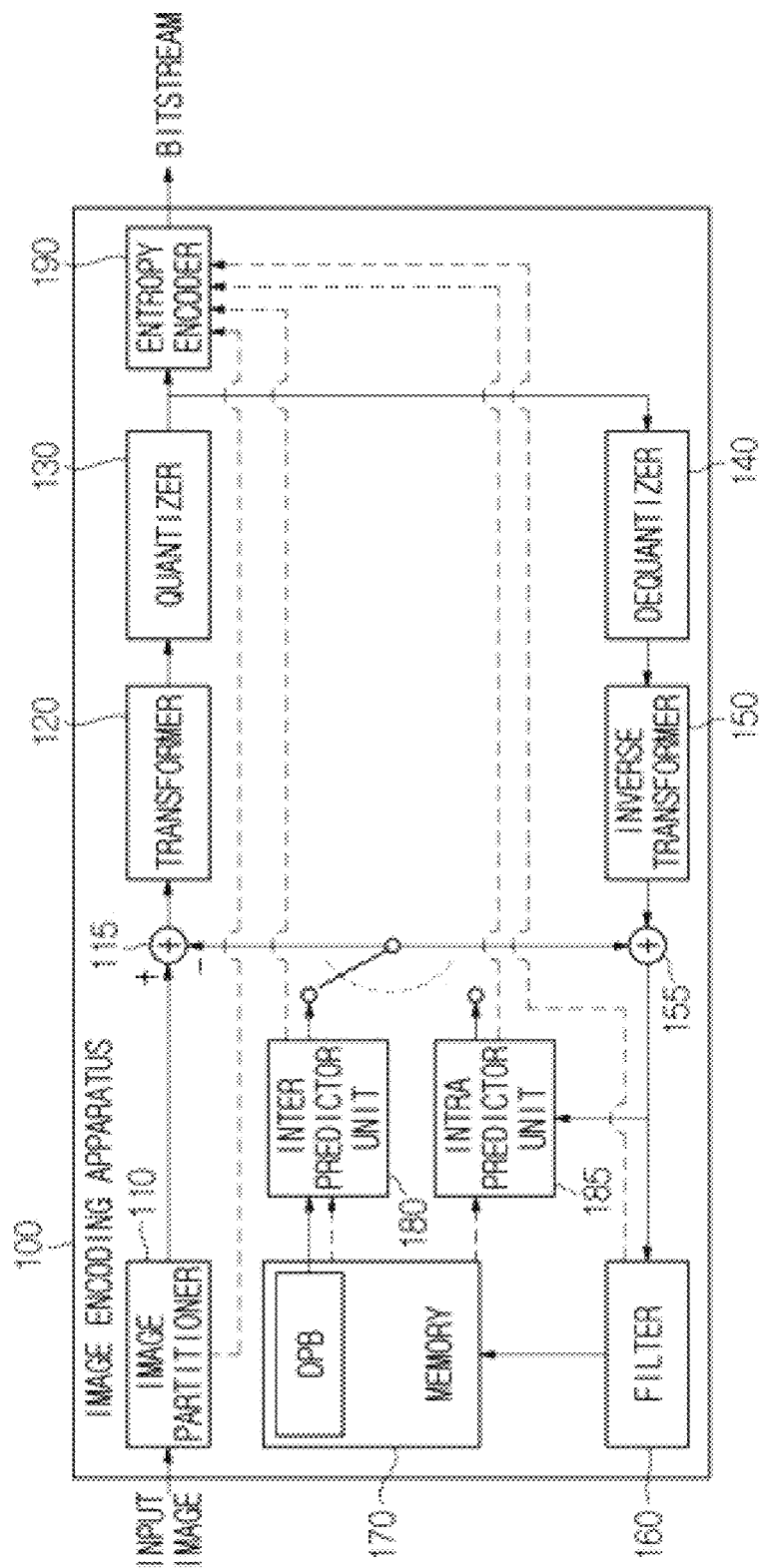
FIG. 2 is a view schematically showing an image encoding apparatus, to which an embodiment of the present disclosure is applicable.

FIG. 2 is a view schematically showing an image encoding apparatus, to which an embodiment of the present disclosure is applicable.

As shown in FIG. 2, the image source device 100 may include an image partitioner 110, a subtractor 115, a transformer 120, a quantizer 130, a dequantizer 140, an inverse transformer 150, an adder 155, a filter 160, a memory 170, an inter predictor 180, an intra predictor 185 and an entropy encoder 190. The inter predictor 180 and the intra predictor 185 may be collectively referred to as a "predictor". The transformer 120, the quantizer 130, the dequantizer 140 and the inverse transformer 150 may be included in a residual processor. The residual processor may further include the subtractor 115.

All or at least some of the plurality of components configuring the image source device 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image source device 100 into one or more processing units. For example, the processing unit may be called a coding unit (CU). The coding unit may be obtained by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth obtained by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The predictor (the inter predictor 180 or the intra predictor 185) may perform prediction on a block to be processed (current block) and generate a predicted block including prediction samples for the current block. The predictor may determine whether intra prediction or inter prediction is applied on a current block or CU basis. The predictor may generate various information related to prediction of the current block and transmit the generated information to the entropy encoder 190. The information on the prediction may be encoded in the entropy encoder 190 and output in the form of a bitstream.

The intra predictor 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 185 may determine the prediction mode applied to the current block by using a prediction mode applied to a neighboring block.

The inter predictor 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter predictor 180 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The predictor may generate a prediction signal based on various prediction methods and prediction techniques described below. For example, the predictor may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the predictor may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance. IBC basically performs prediction in the current picture, but may be performed similarly to inter prediction in that a reference block is derived within the current picture. That is, IBC may use at least one of the inter prediction techniques described in the present disclosure.

The prediction signal generated by the predictor may be used to generate a reconstructed signal or to generate a residual signal. The subtractor 115 may generate a residual signal (residual block or residual sample array) by subtracting the prediction signal (predicted block or prediction sample array) output from the predictor from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform obtained based on a prediction signal generated using all previously reconstructed pixels. In addition, the transform process may be applied to square pixel blocks having the same size or may be applied to blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block type into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 190 and/or a storage unit (not shown) storing the signal may be included as internal/external element of the image source device 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter predictor 180 or the intra predictor 185 to generate a reconstructed signal (reconstructed picture, reconstructed block, reconstructed sample array). If there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter predictor 180. When inter prediction is applied through the image source device 100, prediction mismatch between the image source device 100 and the image decoding apparatus may be avoided and encoding efficiency may be improved.

The DPB of the memory 170 may store the modified reconstructed picture for use as a reference picture in the inter predictor 180. The memory 170 may store the motion information of the block from which the motion information in the current picture is derived (or encoded) and/or the motion information of the blocks in the picture that have already been reconstructed. The stored motion information may be transmitted to the inter predictor 180 and used as the motion information of the spatial neighboring block or the motion information of the temporal neighboring block. The memory 170 may store reconstructed samples of reconstructed blocks in the current picture and may transfer the reconstructed samples to the intra predictor 185.

Overview of Image Decoding Apparatus

Figure 3:
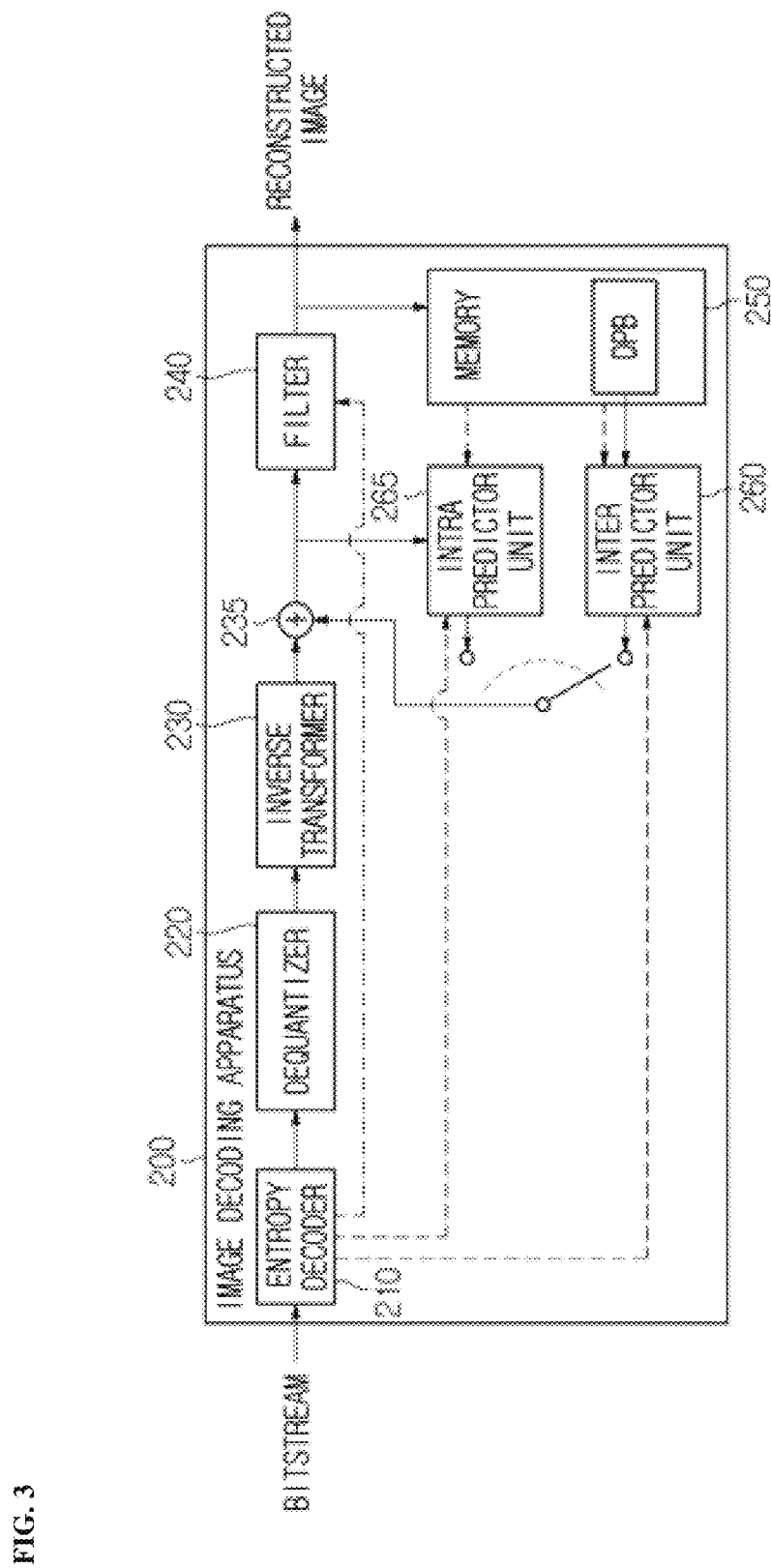
FIG. 3 is a view schematically showing an image decoding apparatus, to which an embodiment of the present disclosure is applicable.

FIG. 3 is a view schematically showing an image decoding apparatus, to which an embodiment of the present disclosure is applicable.

As shown in FIG. 3, the image reception device 200 may include an entropy decoder 210, a dequantizer 220, an inverse transformer 230, an adder 235, a filter 240, a memory 250, an inter predictor 260 and an intra predictor 265. The inter predictor 260 and the intra predictor 265 may be collectively referred to as a "predictor". The dequantizer 220 and the inverse transformer 230 may be included in a residual processor.

All or at least some of a plurality of components configuring the image reception device 200 may be configured by a hardware component (e.g., a decoder or a processor) according to an embodiment. In addition, the memory 250 may include a decoded picture buffer (DPB) or may be configured by a digital storage medium.

The image reception device 200, which has received a bitstream including video/image information, may reconstruct an image by performing a process corresponding to a process performed by the image source device 100 of FIG. 2. For example, the image reception device 200 may perform decoding using a processing unit applied in the image encoding apparatus. Thus, the processing unit of decoding may be a coding unit, for example. The coding unit may be obtained by partitioning a coding tree unit or a largest coding unit. The reconstructed image signal decoded and output through the image reception device 200 may be reproduced through a reproducing apparatus (not shown).

The image reception device 200 may receive a signal output from the image encoding apparatus of FIG. 2 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the predictor (the inter predictor 260 and the intra predictor 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image reception device 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter predictor 160 or the intra predictor 265.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 210 and may determine a specific intra/inter prediction mode (prediction technique).

It is the same as described in the predictor of the image source device 100 that the predictor may generate the prediction signal based on various prediction methods (techniques) which will be described later.

The intra predictor 265 may predict the current block by referring to the samples in the current picture. The description of the intra predictor 185 is equally applied to the intra predictor 265.

The inter predictor 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 260 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the predictor (including the inter predictor 260 and/or the intra predictor 265). If there is no residual for the block to be processed, such as when the skip mode is applied, the predicted block may be used as the reconstructed block. The description of the adder 155 is equally applicable to the adder 235. The adder 235 may be called a reconstructor or a reconstructed block generator. The generated reconstructed signal may be used for intra prediction of a next block to be processed in the current picture and may be used for inter prediction of a next picture through filtering as described below.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter predictor 260. The memory 250 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 250 may store reconstructed samples of reconstructed blocks in the current picture and transfer the reconstructed samples to the intra predictor 265.

In the present disclosure, the embodiments described in the filter 160, the inter predictor 180, and the intra predictor 185 of the image source device 100 may be equally or correspondingly applied to the filter 240, the inter predictor 260, and the intra predictor 265 of the image reception device 200.

Picture Partitioning—Subpicture, Slice, Tile

A picture may be partitioned into one or more tile rows and one or more tile columns A tile may be a sequence of coding tree units (CTUs) covering a rectangular area within a picture.

A slice may contain an integer number of complete tiles, or an integer number of consecutive complete CTU rows contained within a tile.

Two modes, e.g., a raster-scan slice mode and a rectangular slice mode, may be supported for slices. In the raster scan slice mode, a slice may contain a sequence of complete tiles in tile raster-scan order of a picture. In contrast, in the rectangular slice mode, a slice may contain a plurality of complete tiles that collectively form a rectangular area of a picture, or a plurality of consecutive complete CTU rows that collectively form a rectangular area of a picture. Tiles included in a rectangular slice may be scanned according to a tile raster-scan order within a rectangular area corresponding to the slice.

A subpicture may contain one or more slices that collectively cover a rectangular area of the picture.

FIGS. 4A to 4D are diagrams illustrating examples of picture partitioning.

Figure 4A:
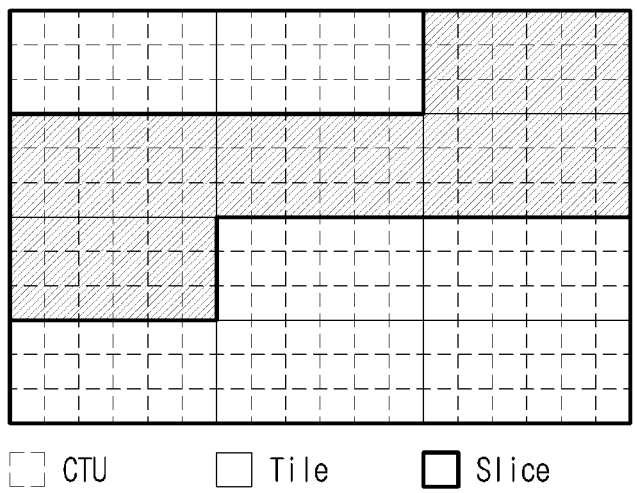
FIGS. 4A to 4D are diagrams illustrating examples of picture partitioning.

Specifically, FIG. 4A is a diagram illustrating an example of raster-scan slice partitioning of a picture. Referring to FIG. 4A, a picture may be partitioned into 12 tiles and 3 raster-scan slices.

Figure 4B:
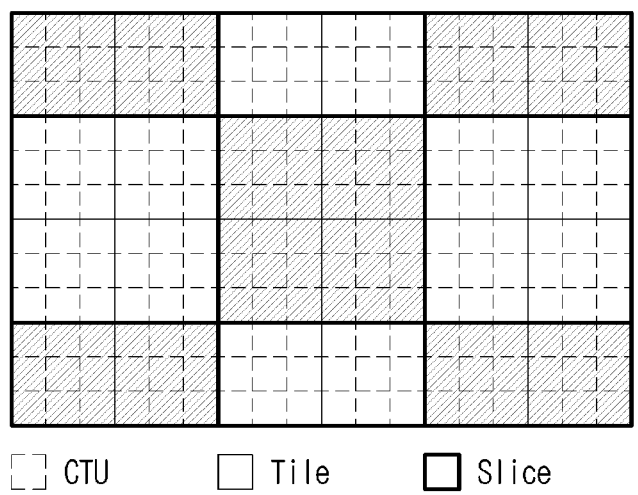

FIG. 4B is a diagram illustrating an example of rectangular slice partitioning of a picture. Referring to FIG. 4B, a picture may be partitioned into 24 tiles (i.e., 6 tile columns and 4 tile rows) and 9 rectangular slices.

Figure 4C:
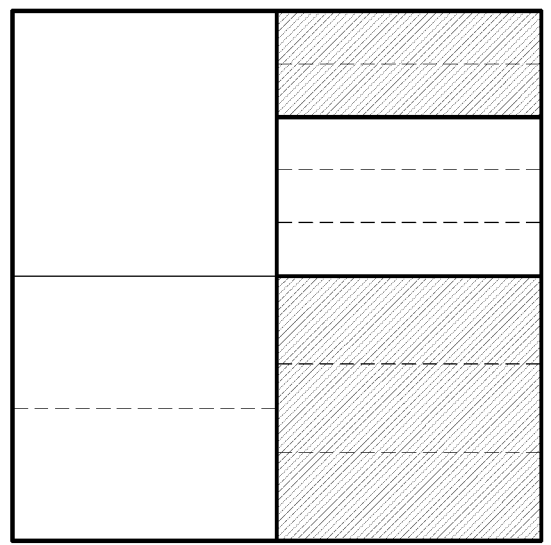

FIG. 4C is a diagram illustrating another example of rectangular slice partitioning of a picture. Referring to FIG. 4C, a picture may be partitioned into 4 tiles (i.e., 2 tile columns and 2 tile rows) and 4 rectangular slices.

Figure 4D:
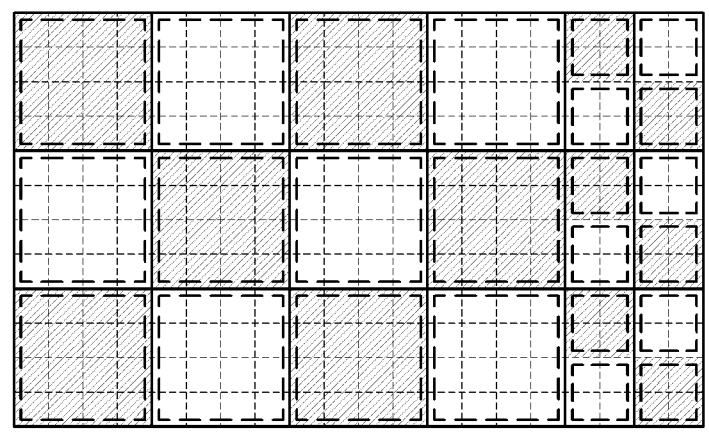

FIG. 4D is a diagram illustrating an example of subpicture partitioning of a picture. Referring to FIG. 4D, a picture may be partitioned into 18 tiles. In this case, each of the left 12 tiles of the picture may cover one slice including 4×4 CTUs. In addition, each of the right 6 tiles of the picture may cover two vertically stacked slices each including 2×2 CTUs. As a result, the picture may be partitioned into 24 slices and 24 subpictures having various sizes, and each slice may correspond to a subpicture.

Example of Coding Layer Structure

A coded video/image according to the present disclosure may be processed, for example, according to a coding layer and structure which will be described below.

Figure 5:
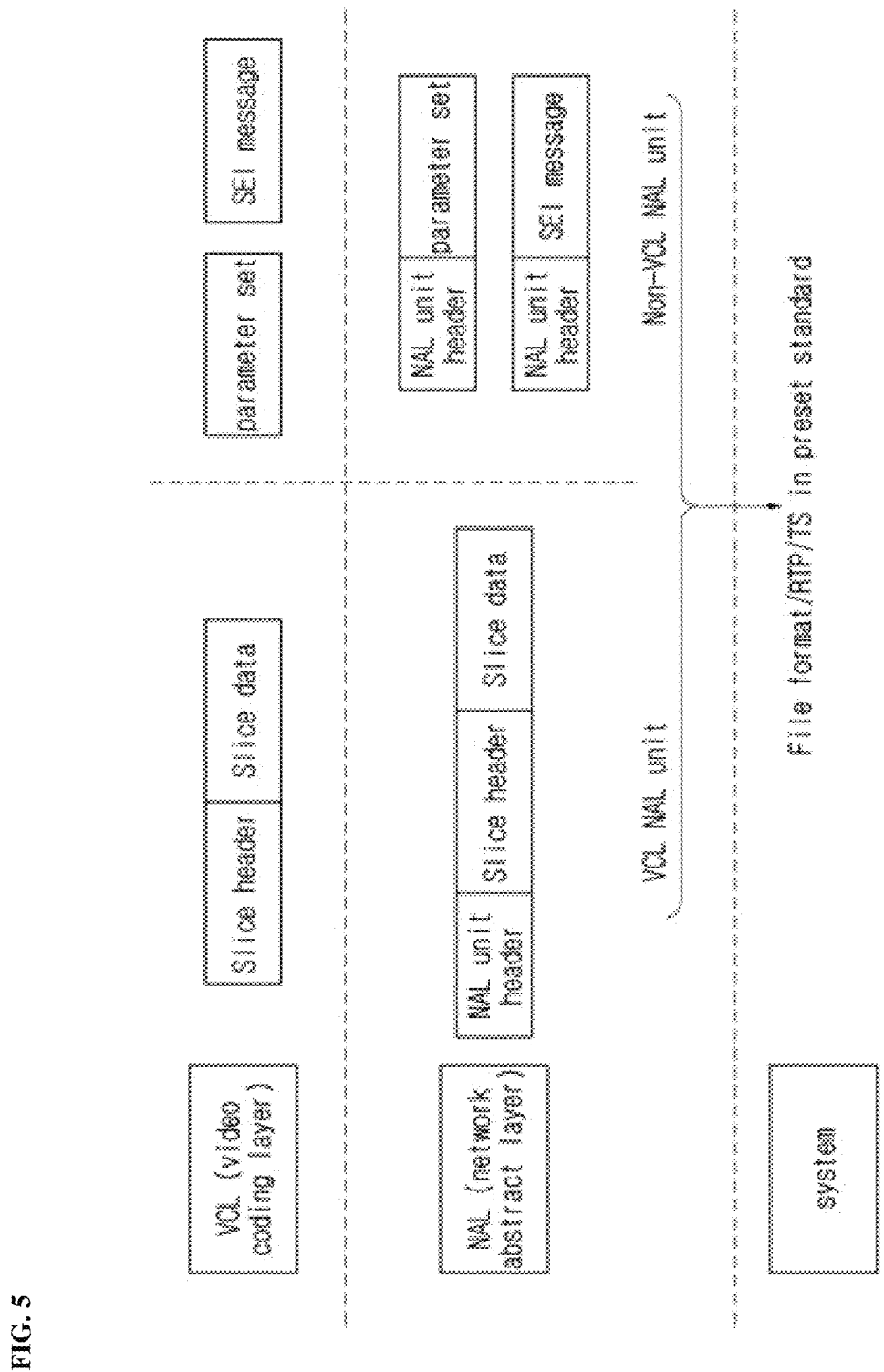
FIG. 5 is a view illustrating an example of a layer structure for a coded image/video.

FIG. 5 is a view illustrating an example of a layer structure for a coded image/video.

The coded image/video is classified into a video coding layer (VCL) for an image/video decoding process and handling itself, a lower system for transmitting and storing encoded information, and a network abstraction layer (NAL) present between the VCL and the lower system and responsible for a network adaptation function.

In the VCL, VCL data including compressed image data (slice data) may be generated or a supplemental enhancement information (SEI) message additionally required for a decoding process of an image or a parameter set including information such as a picture parameter set (PPS), a sequence parameter set (SPS) or a video parameter set (VPS) may be generated.

In the NAL, header information (NAL unit header) may be added to a raw byte sequence payload (RBSP) generated in the VCL to generate a NAL unit. In this case, the RBSP refers to slice data, a parameter set, an SEI message generated in the VCL. The NAL unit header may include NAL unit type information specified according to RBSP data included in a corresponding NAL unit.

As shown in FIG. 5, the NAL unit may be classified into a VCL NAL unit and a non-VCL NAL unit according to the type of the RBSP generated in the VCL. The VCL NAL unit may mean a NAL unit including information on an image (slice data), and the Non-VCL NAL unit may mean a NAL unit including information (parameter set or SEI message) required to decode an image.

The VCL NAL unit and the Non-VCL NAL unit may be attached with header information and transmitted through a network according to the data standard of the lower system. For example, the NAL unit may be modified into a data format of a predetermined standard, such as H.266/VVC file format, RTP (Real-time Transport Protocol) or TS (Transport Stream), and transmitted through various networks.

As described above, in the NAL unit, a NAL unit type may be specified according to the RBSP data structure included in the corresponding NAL unit, and information on the NAL unit type may be stored in a NAL unit header and signaled. For example, this may be largely classified into a VCL NAL unit type and a non-VCL NAL unit type depending on whether the NAL unit includes information on an image (slice data). The VCL NAL unit type may be classified according to the property and type of the picture included in the VCL NAL unit, and the Non-VCL NAL unit type may be classified according to the type of a parameter set.

An example of the NAL unit type specified according to the type of the parameter set/information included in the Non-VCL NAL unit type will be listed below.

DCI (Decoding capability information) NAL unit type (NUT): Type for NAL unit including DCI VPS (Video Parameter Set) NUT: Type for NAL unit including VPS SPS(Sequence Parameter Set) NUT: Type for NAL unit including SPS PPS (Picture Parameter Set) NUT: Type for NAL unit including PPS APS (Adaptation Parameter Set) NUT: Type for NAL unit including APS PH (Picture header) NUT: Type for NAL unit including a picture header The above-described NAL unit types may have syntax information for a NAL unit type, and the syntax information may be stored in a NAL unit header and signaled. For example, the syntax information may be nal_unit_type, and the NAL unit types may be specified using nal_unit_type values.

Meanwhile, one picture may include a plurality of slices, and one slice may include a slice header and slice data. In this case, one picture header may be further added to a plurality of slices (slice header and slice data set) in one picture. The picture header (picture header syntax) may include information/parameters commonly applicable to the picture. The slice header (slice header syntax) may include information/parameters commonly applicable to the slice. The APS (APS syntax) or PPS (PPS syntax) may include information/parameters commonly applicable to one or more slices or pictures. The SPS (SPS syntax) may include information/parameters commonly applicable to one or more sequences. The VPS (VPS syntax) may information/parameters commonly applicable to multiple layers. The DCI (DCI syntax) may include information/parameters related to decoding capability.

In the present disclosure, a high level syntax (HLS) may include at least one of the APS syntax, the PPS syntax, the SPS syntax, the VPS syntax, the DCI syntax, the picture header syntax or the slice header syntax. In addition, in the present disclosure, a low level syntax (LLS) may include, for example, a slice data syntax, a CTU syntax, a coding unit syntax, a transform unit syntax, etc.

In the present disclosure, image/video information encoded in the encoding apparatus and signaled to the decoding apparatus in the form of a bitstream may include not only in-picture partitioning related information, intra/inter prediction information, residual information, in-loop filtering information but also information on the slice header, information on the picture header, information on the APS, information on the PPS, information on the SPS, information on the VPS and/or information on the DCI. In addition, the image/video information may further include general constraint information and/or information on a NAL unit header.

Multi-Layer Based Coding

Image/video coding according to the present disclosure may include multi-layer based image/video coding. The multi-layer based image/video coding may include scalable coding. In multi-layer based coding or scalable coding, input signals may be processed for each layer. According to the layer, input signals (input images/videos) may have different values in terms of at least one of resolution, frame rate, bit-depth, color format, aspect ratio or view. In this case, it is possible to reduce redundant information transmission/processing and to increase compression efficiency, by performing inter-layer prediction using a difference between layers (e.g., based on scalability).

Figure 6:
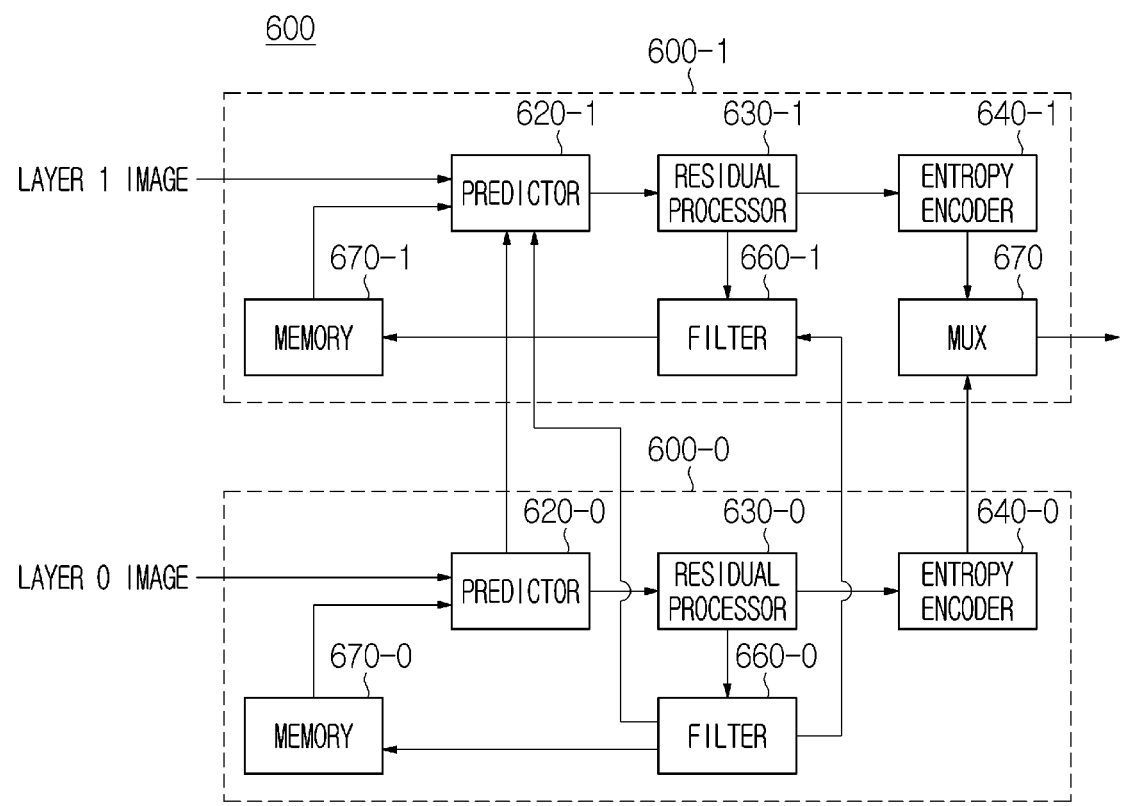
FIG. 6 is a schematic block diagram of a encoding apparatus, to which embodiment(s) of the present disclosure is applicable, and, in which encoding of a multi-layer video/image signal is performed.

FIG. 6 is a schematic block diagram of a encoding apparatus, to which embodiment(s) of the present disclosure is applicable, and, in which encoding of a multi-layer video/image signal is performed.

The encoding apparatus 600 of FIG. 6 may include the encoding apparatus of FIG. 2. Compared to FIG. 2, the image partitioner 110 and the adder 155 are not shown in the encoding apparatus 600 of FIG. 6, the encoding apparatus 600 may include the image partitioner 110 and the adder 155. In an embodiment, the image partitioner 110 and the adder 155 may be included in unit of layer. Hereinafter, multi-layer based prediction will be focused upon in the description of FIG. 6. For example, in addition to the following description, the encoding apparatus 600 may include the technical idea of the encoding apparatus described above with reference to FIG. 2.

For convenience of description, a multi-layer structure consisting of two layers is shown in FIG. 6. However, the embodiments of the present disclosure are not limited to two layers and the multi-layer structure, to which the embodiment of the present disclosure is applied, may include two or more layers.

Referring to FIG. 6, the encoding apparatus 600 includes an encoder 600-1 of layer 1 and an encoder 600-0 of layer 0. Layer 0 may be a base layer, a reference layer or a lower layer, and layer 1 may be an enhancement layer, a current layer or a higher layer.

The encoder 600-1 of layer 1 may include a predictor 620-1, a residual processor 630-1, a filter 660-1, a memory 670-1, an entropy encoder 640-1 and a multiplexer (MUX) 640. In an embodiment, the MUX 640 may be included as an external component.

The encoder 600-0 of layer 0 may include a predictor 620-0, a residual processor 630-0, a filter 660-0, a memory 670-0 and an entropy encoder 640-0.

The predictors 620-0 and 620-1 may perform prediction with respect to input images based on various prediction schemes as described above. For example, the predictors 620-0 and 620-1 may perform inter prediction and intra prediction. The predictors 620-0 and 620-1 may perform prediction in a predetermined processing unit. The prediction unit may be a coding unit (CU) or a transform unit (TU). A predicted block (including prediction samples) may be generated according to the result of prediction and, based on this, the residual processor may derive a residual block (including residual samples).

Through inter prediction, prediction may be performed based on information on at least one of a previous picture and/or a next picture of a current picture, thereby generating a prediction block. Through intra prediction, prediction may be performed based on neighboring samples in a current picture, thereby generating a prediction block.

As an inter prediction mode or method, the above-described various prediction modes or methods may be used. In inter prediction, a reference picture may be selected for a current block to be predicted, and a reference block corresponding to the current block may be selected from the reference picture. The predictors 620-0 and 620-1 may generate a predicted block based on the reference block.

In addition, the predictor 620-1 may perform prediction for layer 1 using information on layer 0. In the present disclosure, a method of predicting information on a current layer using information on another layer is referred to as inter-layer prediction, for convenience of description.

Information on a current layer predicted using information on another layer (that is, predicted by inter-layer prediction) may be at least one of texture, motion information, unit information or a predetermined parameter (e.g., a filtering parameter, etc.).

In addition, information on another layer used for prediction of the current layer (that is, used for inter-layer prediction) may be at least one of texture, motion information, unit information or a predetermined parameter (e.g., a filtering parameter, etc.).

Inter-layer prediction, a current block may be a block in a current picture in a current layer (e.g., layer 1) and may be a block to be coded. A reference block is a block in a picture (reference picture) belonging to the same access unit (AU) as a picture (current picture), to which the current block belongs, on a layer (reference layer, e.g., layer 0) referred to for prediction of the current block, and may be a block corresponding to the current block.

As an example of inter-layer prediction, there is inter-layer motion prediction for predicting motion information of a current layer using motion information of a reference layer. According to inter-layer motion prediction, motion information of a current block may be predicted using motion information of a reference block. That is, in deriving motion information according to the inter prediction mode which will be described below, a motion information candidate may be derived based on motion information of an inter-layer reference block instead of a temporal neighboring block.

When inter-layer motion prediction is applied, the predictor 620-1 may scale and use reference block (that is, inter-layer reference block) motion information of the reference layer.

As another example of inter-layer prediction, inter-layer texture prediction may use texture of a reconstructed reference block as a prediction value for a current block. In this case, the predictor 620-1 may scale the texture of the reference block by up-scaling. Inter-layer texture prediction may be referred to as inter-layer (reconstructed) sample prediction or simply inter-layer prediction.

In inter-layer parameter prediction which is another example of inter-layer prediction, a derived parameter of a reference layer may be reused in a current layer or a parameter for a current layer may be derived based on a parameter used in a reference layer.

In inter-layer residual prediction which is another example of inter-layer prediction, residual information of a current layer may be predicted using residual information of another layer and, based on this, prediction of a current block may be performed.

In inter-layer difference prediction which is another example of inter-layer prediction, prediction of a current block may be performed using a difference between images obtained by up-sampling or down-sampling a reconstructed picture of a current layer and a reconstructed picture of a reference layer.

In inter-layer syntax prediction which is another example of inter-layer prediction, texture of a current block may be predicted or generated using syntax information of a reference layer. In this case, syntax information of a referenced reference layer may include information on an intra prediction mode and motion information.

A plurality of prediction methods using the above-described inter-layer may be used when predicting a particular block.

Here, as an example of inter-layer prediction, although inter-layer texture prediction, inter-layer motion prediction, inter-layer unit information prediction, inter-layer parameter prediction, inter-layer residual prediction, inter-layer difference prediction, inter-layer syntax prediction, etc. are described, inter-layer prediction applicable in the present disclosure is not limited thereto.

For example, inter-layer prediction may be applied as an extension of inter prediction for a current layer. That is, by including a reference picture derived from a reference layer in reference pictures capable of being referenced for inter prediction of a current block, it is possible to perform inter prediction for the current block.

In this case, the inter-layer reference picture may be included in a reference picture list for the current block. The predictor 620-1 may perform inter prediction for the current block using an inter-layer reference picture.

Here, the inter-layer reference picture may be a reference picture constructed by sampling the reconstructed picture of a reference layer to correspond to the current layer. Accordingly, when the reconstructed picture of the reference layer corresponds to the picture of the current layer, the reconstructed picture of the reference layer may be used as an inter-layer reference picture without sampling. For example, when the widths and heights of samples are the same in the reconstructed picture of the reference layer and the reconstructed picture of the current layer and an offset between the top left end, top right end, bottom left end and bottom right end in the picture of the reference layer and the top left end, top right end, bottom left end and bottom right end in the picture of the current layer is 0, the reconstructed picture of the reference layer may be used as the inter-layer reference picture of the current layer without being sampled again.

In addition, the reconstructed picture of the reference layer, from which the inter-layer reference picture is derived, may be a picture belonging to the same AU as the current picture to be encoded.

When inter prediction for a current block is performed by including an inter-layer reference picture in a reference picture list, the position of the inter-layer reference picture in the reference picture list may be different between reference picture lists L0 and L1. For example, in reference picture list L0, the inter-layer reference picture may be located after short-term reference pictures before the current picture and, in reference picture list L1, the inter-layer reference picture may be located at the end of the reference picture list.

Here, reference picture list L0 is a reference picture list used for inter prediction of P slice or a reference picture list used as a first reference picture list in inter prediction of B slice. Reference picture list L1 may be a second reference picture list used for inter prediction of B slice.

Accordingly, reference picture list L0 may consist of short-term reference picture(s) before the current picture, an inter-layer reference picture, short-term reference picture(s) after the current picture and a long-term reference picture in this order. Reference picture list L1 may consist of short-term reference picture(s) after the current picture, short-term reference picture(s) before the current picture, a long-term reference picture and an inter-layer reference picture in this order.

In this case, a predictive (P) slice is a slice for which intra prediction is performed or inter prediction is performed using a maximum of one motion vector per prediction block and a reference picture index. A bi-predictive (B) slice is a slice for which intra prediction is performed or prediction is performed using a maximum of two motion vectors per prediction block and a reference picture index. In this regard, an intra (I) slice is a slice to which only intra prediction is applied.

In addition, when inter prediction for a current block is performed based on a reference picture list including an inter-layer reference picture, the reference picture list may include a plurality of inter-layer reference pictures derived from a plurality of layers.

When a plurality of inter-layer reference pictures is included, the inter-layer reference pictures may be alternately arranged in reference picture lists L0 and L1. For example, assume that two inter-layer reference pictures such as inter-layer reference picture ILRPi and inter-layer reference picture ILRPj are included in the reference picture list used for inter prediction of the current block. In this case, in reference picture list L0, ILRPi may be located after short-term reference pictures before the current picture and ILRPj may be located at the end of the list. In addition, in reference picture list L1, ILRPi may be located at the end of the list and ILRPj may be located after short-term reference pictures after the current picture.

In this case, reference picture list L0 may consist of short-term reference picture(s) before the current picture, an inter-layer reference picture ILRPi, short-term reference picture(s) after the current picture, a long-term reference picture and an inter-layer reference picture ILRPj in this order. Reference picture list L1 may consist of short-term reference picture(s) after the current picture, an inter-layer reference picture ILRPj, short-term reference picture(s) before the current picture, a long-term reference picture and an inter-layer reference picture ILRPi in this order.

In addition, one of two inter-layer reference pictures may be an inter-layer reference picture derived from a scalable layer for resolution and the other may be an inter-layer reference picture derived from a layer for providing another view. In this case, for example, if ILRPi is an inter-layer reference picture derived from a layer for providing different resolution and ILRPj is an inter-layer reference picture derived from a layer for providing a different view, in the case of scalable video coding supporting only scalability excluding a view, reference picture list L0 may consist of short-term reference picture(s) before the current picture, an inter-layer reference picture ILRPi, short-term reference picture(s) after the current picture, and a long-term reference picture in this order, and reference picture list L1 may consist of short-term reference picture(s) after the current picture, short-term reference picture(s) before the current picture, a long-term reference picture and an inter-layer reference picture ILRPi in this order.

Meanwhile, in inter-layer prediction, as information on an inter-layer reference picture, only a sample value may be used, only motion information (motion vector) may be used or both a sample value and motion information may be used. The predictor 620-1 may use only a sample value of the inter-layer reference picture, may use only motion information (motion vector) of the inter-layer reference picture or may use both the sample value and motion information of the inter-layer reference picture according to information received from the encoding apparatus, when the reference picture index indicates an inter-layer reference picture.

When only the sample value of the inter-layer reference picture is used, the predictor 620-1 may derive samples of a block specified by a motion vector from the inter-layer reference picture as a prediction sample of a current block. In the case of scalable video coding which does not take a view into consideration, a motion vector in inter prediction (inter-layer prediction) using an inter-layer reference picture may be set to a fixed value (e.g., 0).

When only the motion information of the inter-layer reference picture is used, the predictor 620-1 may use a motion vector specified by the inter-layer reference picture as a motion vector predictor for deriving the motion vector of the current block. In addition, the predictor 620-1 may use a motion vector specified by the inter-layer reference picture as the motion vector of the current block.

When both the sample value and motion information of the inter-layer reference picture are used, the predictor 620-1 may use, for prediction of the current block, a sample of a region corresponding to the current block in the inter-layer reference picture and motion information (motion vector) specified in the inter-layer reference picture.

The encoding apparatus may transmit a reference index indicating an inter-layer reference picture in a reference picture list to the decoding apparatus, when inter-layer prediction is applied, and may transmit, to the decoding apparatus, information for specifying which information (sample information, motion information or sample information and motion information) is used from the inter-layer reference picture, that is, information for specifying a dependency type of dependency for inter-layer prediction between two layers.

Figure 7:
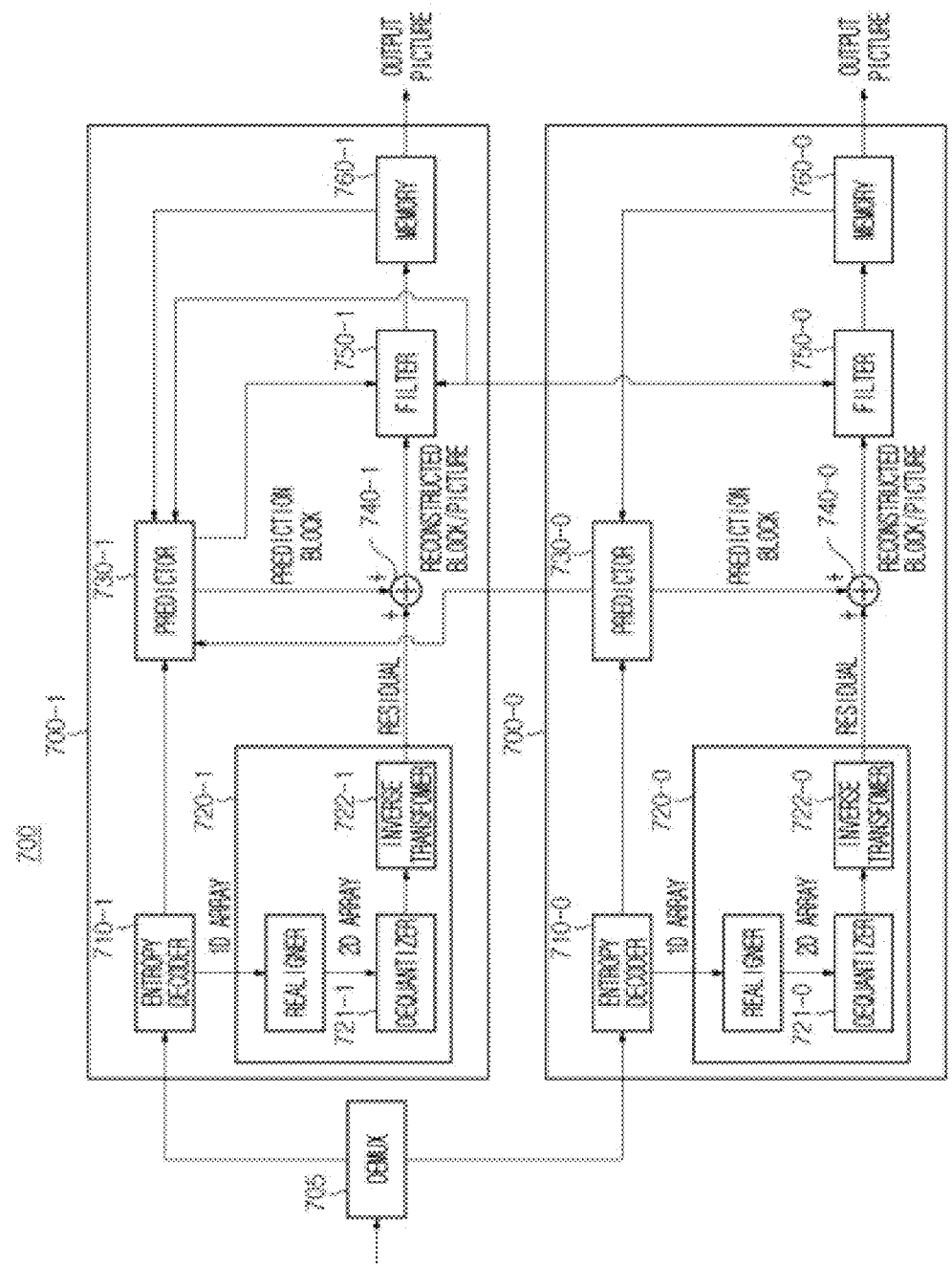
FIG. 7 is a schematic block diagram of a decoding apparatus, to which embodiment(s) of the present disclosure is applicable, and, in which decoding of a multi-layer video/image signal is performed.

FIG. 7 is a schematic block diagram of a decoding apparatus, to which embodiment(s) of the present disclosure is applicable, and, in which decoding of a multi-layer video/image signal is performed. The decoding apparatus of FIG. 7 may include the decoding apparatus of FIG. 3. A realigner shown in FIG. 7 may be omitted or included in a dequantizer. In the description of this drawing, multi-layer based prediction will be focused upon. In addition, the description of the decoding apparatus of FIG. 3 may be included.

In the example of FIG. 7, for convenience of description, a multi-layer structure consisting of two layers will be described. However, it should be noted that embodiments of the present disclosure are not limited thereto, and the multi-layer structure, to which the embodiment of the present disclosure is applied, may include two or more layers.

Referring to FIG. 7, the decoding apparatus 700 may include a decoder 700-1 of layer 1 and a decoder 700-0 of layer 1. The decoder 700-1 of layer 1 may include an entropy decoder 710-1, a residual processor 720-1, a predictor 730-1, an adder 740-1, a filter 750-1 and a memory 760-1. The decoder 700-2 of layer 0 may include an entropy decoder 710-0, a residual processor 720-0, a predictor 730-0, an adder 740-0, a filter 750-0 and a memory 760-0.

When a bitstream including image information is received from the encoding apparatus, a DEMUX 705 may demultiplex information for each layer and transmit the information to the decoding apparatus for each layer.

The entropy decoders 710-1 and 710-0 may perform decoding in correspondence with a coding method used in the encoding apparatus. For example, when CABAC is used in the encoding apparatus, the entropy decoders 710-1 and 710-0 may perform entropy decoding using CABAC.

When a prediction mode for a current block is an intra prediction mode, the predictors 730-1 and 730-0 may perform intra prediction for the current block based on neighboring reconstructed samples in the current picture.

When an prediction mode for a current block is an inter prediction mode, the predictors 730-1 and 730-0 may perform inter prediction for the current block based on information included in at least one of picture before or after the current picture. Some or all of motion information necessary for inter prediction may be derived by checking information received from the encoding apparatus.

When a skip mode is applied as an inter prediction mode, residual is not transmitted from the encoding apparatus and a prediction block may be a reconstructed block.

Meanwhile, the predictor 730-1 of layer 1 may perform inter prediction or intra prediction using only information on layer 1 and perform inter-layer prediction using information on another layer (layer 0).

As information on a current layer predicted using information on another layer (e.g., predicted by inter-layer prediction), there may be at least one of texture, motion information, unit information, a predetermined parameter (e.g., a filtering parameter, etc.).

As information on another layer used for prediction of the current layer (e.g., used for inter-layer prediction), there may be at least one of texture, motion information, unit information, a predetermined parameter (e.g., a filtering parameter, etc.).

In inter-layer prediction, a current block may be a block in a current picture in a current layer (e.g., layer 1) and may be a block to be decoded. A reference block may be a block in a picture (reference picture) belonging to the same access unit (AU) as a picture (current picture), to which the current block belongs, on a layer (reference layer, e.g., layer 0) referenced for prediction of the current block and may be a block correspond to the current block.

The decoding apparatus 700 may perform inter-layer prediction as described in the encoding apparatus 600. For example, the decoding apparatus 700 may perform inter-layer texture prediction, inter-layer motion prediction, inter-layer unit information prediction, inter-layer parameter prediction, inter-layer residual prediction, inter-layer difference prediction, inter-layer syntax prediction, etc., as described in the encoding apparatus 600 and inter-layer prediction applicable in the present disclosure is not limited thereto.

The predictor 730-1 may perform inter-layer prediction using an inter-layer reference picture, when a reference picture index received from the encoding apparatus or a reference picture index derived from a neighboring block indicates an inter-layer reference picture in a reference picture list. For example, the predictor 730-1 may derive a sample value of a region specified by a motion vector in the inter-layer reference picture as a prediction block for a current block, when a reference picture index indicates an inter-layer reference picture.

In this case, the inter-layer reference picture may be included in a reference picture list for a current block. The predictor 730-1 may perform inter prediction for the current block using the inter-layer reference picture.

As described above in the encoding apparatus 600, in operation of the decoding apparatus 700, the inter-layer reference picture may be a reference picture constructed by sampling a reconstructed picture of a reference layer to correspond to a current layer. Processing for the case where the reconstructed picture of the reference layer corresponds to the picture of the current layer may be performed in the same manner as the encoding process.

In addition, as described above in the encoding apparatus 600, in operation of the decoding apparatus 700, a reconstructed picture of a reference layer, from which an inter-layer reference picture is derived, may be a picture belonging to the same AU as a current picture to be encoded.

In addition, as described above in the encoding apparatus 600, in operation of the decoding apparatus 700, when inter prediction for a current block is performed by including the inter-layer reference picture in a reference picture list, the position of the inter-layer reference picture in the reference picture list may be different between reference picture lists L0 and L1.

In addition, as described above in the encoding apparatus 600, in operation of the decoding apparatus 700, when inter prediction for a current block is performed based on a reference picture list including an inter-layer reference picture, the reference picture list may include a plurality of inter-layer reference pictures derived from a plurality of layers, and arrangement of inter-layer reference pictures may be performed to correspond to that described in the encoding process.

In addition, as described above in the encoding apparatus 600, in operation of the decoding apparatus 700, as information on an inter-layer reference picture, only a sample value may be used, only motion information (motion vector) may be used or both a sample value and motion information may be used.

The decoding apparatus 700 may receive a reference index indicating an inter-layer reference picture in a reference picture list from the encoding apparatus 600 and perform inter-layer prediction based on the same. In addition, the decoding apparatus 700 may receive, from the multi-layer encoding apparatus 500, information for specifying which information (sample information, motion information or sample information and motion information) is used from the inter-layer reference picture, that is, information for specifying a dependency type of dependency for inter-layer prediction between two layers.

Composition Picture

An image spatially partitioned into one or more patches may be reconstructed into a composite picture in an image output/playback process. A composite picture may include at least one of patches in an image. In one example, a patch may be referred to as a subpicture. In another example, a patch may include a tile/tile group or a rectangular slice.

In one example, a composite picture is obtained from decoding output of a group of patches/subpictures spatially arranged within one whole picture and may represent a group of patches/subpictures suitable for display. Here, the whole picture may include a packed picture or a projected picture obtained in the process of processing a 360 video. A composite picture may be correctly decoded and output (or rendered/displayed) without other patches or subpictures not included in the composite picture.

An SEI message design for describing a composite picture generated from pictures included in an access unit (AU) in a multilayer bitstream has been proposed. According to the SEI message design, two SEI messages are used. One of them includes layer composition position information specifying a picture area in a layer used for a composite picture, and the other includes composition layer information specifying a method of arranging the picture area. However, such an existing SEI message design has the following problems.

First, complexity may unnecessarily increase because two SEI messages are used to describe a composite picture. Second, since the SEI message carries composite picture information of multiple output layer sets (OLSs), it is just a simple design in which one SEI message is present for the entire bitstream (i.e., the target OLS of the decoding process). Third, since the entire area of a picture in a layer is used to generate a composite picture, it is inefficient when considering that there are many cases in which only a specific region of interest (ROI) is used. Fourth, in order to signal the SEI message, the layers included in the associated OLS need to be known through a video parameter set (VPS), and thus, parsing dependency for OLS-related information in the VPS may occur. Fifth, a composite picture is not generated from a picture area in a non-output layer, whereas the existing SEI message design does not consider whether a layer for a composite picture is an output layer.

Fifth, the existing SEI message design allows a gap and overlap between patches in a composite picture, but does not provide specific content for supporting such features.

Sixth, when a plurality of OLSs is present in the bitstream, a relationship between the SEI message and the target OLS may not be described. Seventh, since the SEI message may be present in an access unit (AU) having an arbitrary temporal ID, a problem may occur when the decoding order and the output order are different, such as in the case of random access (RA), and there is a risk that an SEI message may be removed within an access unit with a temporal ID greater than 0.

Eighth, the existing SEI message design has a problem of being inefficient in terms of bit cost.

In order to solve the above problems, a composite picture information (CPI) SEI message according to embodiments of the present disclosure is a single message and may be applied to both a single layer and a multi-layer structure. Also, source pictures containing patches in the composite picture shall be included in the output layer.

Hereinafter, embodiments of the present disclosure will be described in detail with reference to the accompanying drawings.

Embodiment 1

According to Embodiment 1 of the present disclosure, a composite picture may be generated based on a single CPI SEI message. To this end, the following features may be applied individually or in combination of two or more.

In one embodiment, the CPI SEI message may include information for generating a composite picture from one or more source pictures in an access unit (AU).

In one embodiment, a composite picture may include one or more rectangular patches.

In one embodiment, each patch in a composite picture may be associated with a rectangular area having a size smaller than or equal to the source picture within a source picture.

In one embodiment, all patches in a composite picture may be associated with areas in source pictures belonging to the same access unit (AU).

In one embodiment, for each patch, a source rectangular area (i.e., an area within the associated picture) and a patch area within a composite picture may have different sizes. In other words, subpicture scaling from a layer to a composite picture may be allowed. However, since it is assumed that all decoded pictures in the layer are used for a composite picture, subpicture cropping may not be allowed.

In one embodiment, in order to support the above-described features, the following information may be signaled for each patch in a composite picture.
  Information on the position of the patch within the composite picture. The information may be signaled as the position of the top-left corner of the patch in the composite picture.
  Information on the size of the patch within the composite picture. The information may be signaled as the width and height of the patch.
  Information on the source of pels in a picture of an access unit (AU) associated with the CPI SEI. The information on the source of pels may be signaled as follows.
  Layer Id of picture in access unit (AU)
  Top-left area in picture corresponding to patch
  Width and height of area in picture corresponding to patch In one embodiment, the size of the composite picture shall be greater than zero. Accordingly, the width of the composite picture shall be greater than 0, and the height of the composite picture shall also be greater than 0.

In one embodiment, the size of the area in the source picture corresponding to the patch in the composite picture shall be greater than zero. Accordingly, the width of each patch shall be greater than 0, and the height of each patch shall also be greater than 0.

In one embodiment, patches in the composite picture shall correspond to areas in the source picture belonging only to the output layer.

In one embodiment, a patch in a composite picture corresponds to an area in a source picture belonging to an output layer, but the source picture may not be output by a decoder. For example, when the value of PictureOutputFlag of the source picture is derived to be 0 according to a specific condition, the source picture may not be output.

Specific examples of the CPI SEI message according to Embodiment 1 of the present disclosure are as shown in FIGS. 8 to 10.

1) CPI SEI Message—First Example

Referring to FIG. 8, the CPI SEI message composite_picture_info( ) may provide information for constructing a composite picture based on one or more patches originating from pictures in an access unit (AU).

Specifically, the CPI SEI message may include syntax elements cpi_width_in_luma_samples and cpi_height_in_luma_samples regarding the size of the composite picture.

cpi_width_in_luma_samples may specify the width of a luma sample unit of each composite picture generated from access units (AUs) to which the SEI is applied. cpi_width_in_luma_samples shall not be equal to zero.

cpi_height_in_luma_samples may specify the height of a luma sample unit of each composite picture generated from access units (AUs) to which the SEI is applied. cpi_height_in_luma_samples shall not be equal to zero.

In addition, the CPI SEI message may include a syntax element cpi_num_patches_minus1 regarding the number of patches in a composite picture. cpi_num_patches_minus1 may specify the number of patches in each composite picture generated from access units (AUs) to which the SEI is applied.

In addition, the CPI SEI message may include a syntax element cpi_scaling_allowed_flag regarding whether scaling of patches is allowed in the composite picture. cpi_scaling_allowed_flag of a first value (e.g., 1) specifies that syntax elements cpi_patch_dest_luma_width[i] and cpi_patch_dest_luma_width[i] regarding the patch size in the composite picture are present in the CPI SEI message (i.e., the scaling is allowed). In contrast, cpi_scaling_allowed_flag of a second value (e.g., 0) specifies that cpi_patch_dest_luma_width[i] and cpi_patch_dest_luma_width[i] are not present in the CPI SEI message (i.e., the scaling is not allowed).

In addition, the CPI SEI message may include a syntax element cpi_gap_allowed_flag regarding whether a gap between patches in a composite patch is allowed. A cpi_gap_allowed_flag of a first value (e.g., 1) may specify that all patches in a composite picture do not cover all areas of the composite picture (i.e., the gap is allowed). In contrast, cpi_gap_allowed_flag of a second value (e.g., 0) may specify that all patches in the composite picture cover all areas of the composite picture (i.e., the gap is not allowed). When cpi_gap_allowed_flag has a first value (e.g., 1), pels in an area not covered by any patch in the composite picture may be initialized to a valid pel value.

In addition, the CPI SEI message may include a syntax element cpi_patch_layer_id[i] regarding a layer to which a source picture for each patch belongs. cpi_patch_layer_id[i] may specify the layer Id of the source picture for an i-th patch.

For i within the range of 0 to cpi_num_patches_minus1, the value of cpi_patch_layer_id[i] shall be the same as any one layer present in the bitstream.

For i in the range from 0 to cpi_num_patches_minus1, a layer with the same layer Id as cpi_patch_layer_id[i] shall be the same as any one output layer in the bitstream.

For i in the range from 0 to cpi_num_patches_minus1, a source picture with the same layer Id as cpi_patch_layer_id[i] may not be present in an access unit (AU) to which the SEI is applied. In this case, an application generating a composite picture based on the SEI may assign a valid pel value to the i-th patch in the composite picture. Also, in this case, the application may additionally assign the same pel value as the pel value to the entire area covering the i-th patch.

In addition, the CPI SEI message may include syntax elements cpi_patch_source_top_left_x[i] and cpi_patch_source_top_left_y[i] regarding the position in the source picture of each patch in the composite picture.

cpi_patch_source_top_left_x[i] may specify the horizontal position of the top-left pel in the source picture for the i-th patch. The value of cpi_patch_source_top_left_x[i] shall be smaller than the value obtained by subtracting 1 (or, alternatively, 2) from the width of the source picture.

cpi_patch_source_top_left_y[i] may specify the vertical position of the top-left pel in the source picture for the i-th patch. The value of cpi_patch_source_top_left_y[i] shall be smaller than the value obtained by subtracting 1 (or, alternatively, 2) from the height of the source picture.

In addition, the CPI SEI message may include syntax elements cpi_patch_source_width_minus1[i] and cpi_patch_source_height_minus1[i] regarding the size of an area in the source picture of each patch in the composite picture.

A value obtained by adding 1 to cpi_patch_source_width_minus1[i] may represent the width of the area in the source picture of the i-th patch. The sum of cpi_patch_source_top_left_x[i] and cpi_patch_source_width_minus1[i] shall be smaller than the width of the source picture in units of luma samples.

A value obtained by adding 1 to cpi_patch_source_height_minus1[i] may represent the height of the area in the source picture of the i-th patch. The sum of cpi_patch_source_top_left_x[i] and cpi_patch_source_height_minus1[i] shall be smaller than the height of the source picture in units of luma samples.

In addition, the CPI SEI message may include syntax elements cpi_patch_dest_top_left_x[i] and cpi_patch_dest_top_left_y[i] regarding the position of each patch in the composite picture.

cpi_patch_dest_top_left_x[i] may specify the horizontal position of the top-left pel in the composite picture for the i-th patch. The value of cpi_patch_dest_top_left_x[i] shall be smaller than the value obtained by subtracting 1 (or, alternatively, 2) from the width of the composite picture (e.g., cpi_width_in_luma_samples−1).

cpi_patch_dest_top_left_y[i] may specify the vertical position of the top-left pel in the composite picture for the i-th patch. The value of cpi_patch_dest_top_left_y[i] shall be smaller than the value obtained by subtracting 1 (or, alternatively, 2) from the height of the composite picture (e.g., cpi_height_in_luma_samples−1).

In addition, the CPI SEI message may include syntax elements cpi_patch_dest_width_minus1[i] and cpi_patch_dest_height_minus1[i] regarding the size of an area in a composite picture of each patch. cpi_patch_dest_width_minus1[i] and cpi_patch_dest_height_minus1[i] may be signaled only when scaling of patches within a composite picture is allowed (e.g., cpi_scaling_allowed_flag==1).

A value obtained by adding 1 to cpi_dest_source_width_minus1[i] may represent the width of the area in the composite picture of the i-th patch. The sum of cpi_patch_dest_top_left_x[i] and cpi_patch_dest_width_minus1[i] shall be smaller than the value obtained by subtracting 1 from the width of the composite picture in units of luma samples (e.g., cpi_width_in_luma_samples−1). If cpi_dest_source_width_minus1[i] is not present, the value of cpi_dest_source_width_minus1[i] may be inferred to be the same value as cpi_source_width_minus1 [i].

A value obtained by adding 1 to cpi_patch_dest_height_minus1[i] may specify the height of the area in the composite picture of the i-th patch. The sum of cpi_patch_dest_top_left_x[i] and cpi_patch_dest_height_minus1[i] shall be smaller than the value obtained by subtracting 1 from the height of the composite picture in units of luma samples (e.g., cpi_height_in_luma_samples−1). If cpi_patch_dest_height_minus1[i] is not present, the value of cpi_patch_dest_height_minus1 [i] may be inferred to be the same value as cpi_source_height_minus1[i].

Meanwhile, the aforementioned cpi_patch_layer_id[i] to cpi_patch_dest_luma_height_minus1[i] may be signaled by the number of patches (e.g., cpi_num_patches_minus1) in the composite picture.

2) CPI SEI Message—Second Example

Next, referring to FIG. 9, the CPI SEI message composite_picture_info( ) may provide information for constructing a composite picture based on one or more patches originating from pictures of an access unit (AU). Hereinafter, a redundant description of the CPI SEI message of FIG. 8 will be omitted.

Like the case of FIG. 8, the CPI SEI message may include syntax elements (hereinafter referred to as "syntax elements A") cpi_width_in_luma_samples, cpi_height_in_luma_samples, cpi_patch_source_top_left_x[i], cpi_patch_source_top_left_y[i], cpi_patch_source_width_minus1[i], cpi_patch_source_height_minus1[i], cpi_patch_dest_top_left_x[i], cpi_patch_dest_top_left_y[i], cpi_patch_source_dest_minus1[i], and cpi_patch_source_dest_minus1[i]. The semantics of each of the syntax elements A are as described above with reference to FIG. 8. However, the descriptor of each of the syntax elements A may be different from that of FIG. 8. Specifically, in the case of FIG. 8, the descriptor of each of the syntax elements A may be ue(v) (i.e., unsigned integer 0-th order Exp-Golomb-coded syntax element with the left bit first). In contrast, in the case of FIG. 9, the descriptor of each of the syntax elements A may be u(v) (i.e., unsigned integer using n bits, which n varies in a manner dependent on the value of other syntax elements).

Meanwhile, unlike the case of FIG. 8, the CPI SEI message may further include a syntax element cpi_position_and_size_bit_len_minus1 regarding the number of signaling bits of the syntax elements A. A value obtained by adding 1 to cpi_position_and_size_bit_len_minus1 may specify the number of signaling bits of the syntax elements A.

3) CPI SEI Message—Third Example

Next, referring to FIG. 10, the CPI SEI message composite_picture_info( ) may provide information for constructing a composite picture based on one or more patches originating from pictures of an access unit (AU). Hereinafter, a redundant description of the CPI SEI message of FIG. 9 will be omitted.

Like the case of FIG. 9, the CPI SEI message may include syntax elements A cpi_width_in_luma_samples, cpi_height_in_luma_samples, cpi_patch_source_top_left_x[i], cpi_patch_source_top_left_y[i], cpi_patch_source_width_minus1[i], cpi_patch_source_height_minus1[i], cpi_patch_dest_top_left_x[i], cpi_patch_dest_top_left_y[i], cpi_patch_source_dest_minus1[i], and cpi_patch_source_dest_minus1[i].

Unlike the case of FIG. 9, the CPI SEI message may further include a syntax element cpi_unit_size specifying a unit size for the syntax elements A. A descriptor of cpi_unit_size, like the syntax elements A, may be u(v).

In addition, the CPI SEI message may include the syntax elements A and a syntax element cpi_position_and_size_bit_len_minus1 regarding the number of signaling bits of cpi_unit_size. A value obtained by adding 1 to cpi_position_and_size_bit_len_minus1 may specify the syntax elements A and the number of signaling bits of cpi_unit_size.

As described above, according to Embodiment 1 of the present disclosure, since a composite picture may be generated based on a single CPI SEI message as in the first to third examples, complexity may be reduced. In addition, a composite picture may be generated from a source picture belonging to a single layer as well as multiple layers. Also, a composite picture may be generated based on one or more patches corresponding to a partial area in a source picture. In addition, as information for a layer to which each patch belongs is signaled within the CPI SEI message, parsing dependency on a video parameter set (VPS) may be removed. Also, a composite picture may be generated only from a source picture belonging to an output layer.

Embodiment 2

According to Embodiment 2 of the present disclosure, a gap and overlap between patches in a composite picture may be supported based on a single CPI SEI message. To this end, the following features may be applied individually or in combination of two or more.

In one embodiment, for each patch, a source rectangular area (i.e., an area within an associated picture) shall be an internal area of the source picture. Accordingly, a source rectangular area outside the source picture may not be present.

In one embodiment, for each patch, among areas covered by the patch, areas outside the composite picture shall not be present. Accordingly, each patch constituting the composite picture may be present only inside the composite patch.

In one embodiment, a gap may be present between two neighboring patches in a composite picture. In other words, an area not covered by any patch may be present in the composite picture.

In one embodiment, there may be an overlap between patches in a composite picture. In other words, an area covered by two or more patches may be present in the composite picture.

In one embodiment, two patches in a composite picture may have the same corresponding area in the same source picture. In other words, a specific area in a source picture may be used twice or more for different patches in a composite picture.

In one embodiment, there cannot be two patches having the same size covering the same area in a composite picture.

To this end, it may be constrained so that two patches having the same size and the same top-left position are not present in the composite picture.

In one embodiment, two patches in the composite picture have the same top-left position, but are different in size. Therefore, when one patch completely covers the other patch, the smaller patch may be constrained to be located above the larger patch.

Embodiment 2 of the present disclosure may be implemented by partially changing the semantics of the CPI SEI messages described above with reference to FIGS. 8 to 10. Specific examples are as follows.

4) CPI SEI Message—Fourth Example and Fifth Example

The CPI SEI message according to the fourth example may have the same syntax structure as the CPI SEI message of the first example described above with reference to FIG. 8. In other words, the CPI SEI message of the fourth example may include syntax elements cpi_width_in_luma_samples, cpi_height_in_luma_samples, cpi_num_patches_minus1, and the like. The semantics of each of the syntax elements is basically the same as that of the first example, and a redundant description thereof will be omitted.

In addition, the CPI SEI message according to the fifth example may have the same syntax structure as the CPI SEI message of the second example described above with reference to FIG. 9. In other words, the CPI SEI message of the fifth example may include syntax elements cpi_position_and_size_bit_len_minus1, cpi_width_in_luma_samples, cpi_height_in_luma_samples, cpi_num_patches_minus1, and the like. The semantics of each of the syntax elements is basically the same as that of the second example, and a redundant description thereof will be omitted.

However, in the case of the fourth and fifth examples, unlike the case of the first example, for syntax elements cpi_patch_source_top_left_x[i], cpi_patch_source_top_left_y[i], cpi_patch_source_width_minus1[i], and cpi_patch_source_height_minus1[i] specifying the position and size of each patch in the source picture, the following constraints may be added.

The sum of cpi_patch_source_top_left_x[i] and cpi_patch_source_width_minus1[i] shall be smaller than the value obtained by subtracting 1 from the width of luma sample units of all pictures in a layer having the same layer id as cpi_patch_layer_id[i] and to which the CPI SEI message is applied. In addition, the sum of cpi_patch_source_top_left_y[i] and cpi_patch_source_height_minus1[i] shall be greater than the value obtained by subtracting 1 from the height of luma sample units of all pictures in a layer having the same layer id as cpi_patch_layer_id[i] and to which the CPI SEI message is applied. Accordingly, the source rectangular area of each patch may not deviate from the source picture.

In addition, in the case of the fourth and fifth examples, unlike the case of the first example, for syntax elements cpi_patch_dest_top_left_x[i], cpi_patch_dest_top_left_y[i], cpi_patch_dest_width_minus1[i] and cpi_patch_dest_height_minus1[i] specifying the position and size of each patch in the composite picture, the following constraints may be added.

The sum of cpi_patch_dest_top_left_x[i] and cpi_patch_dest_width_minus1[i] shall be smaller than the value of the syntax element cpi_width_in_luma_samples specifying the width of luma sample units of each composite picture. In addition, the sum of cpi_patch_source_top_left_y[i] and cpi_patch_source_height_minus1[i] shall be smaller than the value of the syntax element cpi_height_in_luma_samples specifying the height of the luma sample unit of each composite picture. Accordingly, each patch may not deviate from the composite picture.

Meanwhile, for a region covered by two or more patches, each pel value in the area may be reconstructed/regenerated based on the patch having the highest patch index i among the patches.

Two patches, in which cpi_patch_dest_top_left_x[i], cpi_patch_dest_top_left_y[i], cpi_patch_dest_width_minus1[i] and cpi_patch_dest_height_minus1[i] are respectively equal to cpi_patch_dest_top_left_x[j], cpi_patch_dest_top_left_y[j], cpi_patch_dest_width_minus1[j] and cpi_patch_dest_height_minus1[j], that is, an i-th patch and a j-th patch, shall not be present in the composite picture. Accordingly, two patches having the same position and size may not be present in the composite picture.

For two patches, that is, an i-th patch and a j-th patch, in the composite picture, when cpi_patch_dest_top_left_x[i] and cpi_patch_dest_top_left_y[i] are respectively equal to cpi_patch_dest_top_left_x[j] and cpi_patch_dest_top_left_y[j] and cpi_patch_dest_width[i] and cpi_patch_dest_height[i] are respectively greater than cpi_patch_dest_width[j] and cpi_patch_dest_height[j], patch index j shall be greater than patch index i. Therefore, when two patches having different sizes in the composite picture have the same top-left position, a patch having a smaller size may have a larger patch index, and patch areas overlapping each other may be reconstructed/reproduced based on a patch having a smaller size.

5) CPI SEI Message—Sixth Example

The CPI SEI message according to the sixth example may have the same syntax structure as the CPI SEI message of the third example described above with reference to FIG. 10. In other words, the CPI SEI message may include syntax elements cpi_position_and_size_bit_len_minus1, cpi_unit_size, cpi_width_in_luma_samples, cpi_height_in_luma_samples, cpi_num_patches_minus1, and the like. The semantics of each of the syntax elements is basically the same as that of the third example, and a redundant description thereof will be omitted.

However, in the case of the sixth example, unlike the case of the third example, for the syntax elements cpi_width_in_luma_samples and cpi_height_in_luma_samples specifying the size (i.e., width and height) of the composite picture, the following semantics may be added.

A variable CompositePictureWidth may be defined as cpi_width_in_luma_samples*cpi_unit_size, and a variable CompositePictureHeight may be defined as cpi_height_in_luma_samples*cpi_unit_size.

In addition, in the case of the sixth example, unlike the case of the third example, for the syntax elements cpi_patch_source_top_left_x[i], cpi_patch_source_top_left_y[i], cpi_patch_source_width_minus1[i] and cpi_patch_source_height_minus1[i] specifying the position and size of each patch in the source picture, the following semantics may be added.

A variable PatchSourceX[i] may be defined as cpi_patch_source_top_left_x[i]*cpi_unit_size, and a variable PatchSourceY[i] may be defined as cpi_patch_source_top_left_y[i]*cpi_unit_size. In addition, a variable PatchSourceWidth[i] may be defined as (cpi_patch_source_width_minus1[i]+1)*cpi_unit_size, and a variable PatchSourceHeight[i] may be defined as (cpi_patch_source_height_minus1[i]+1)*cpi_unit_size.

In this case, the sum of PatchSourceX[i] and PatchSourceWidth[i] shall be less than the width of the luma sample unit of all pictures in the layer having the same layer id as cpi_patch_layer_id[i] and to which the CPI SEI message is applied. In addition, the sum of PatchSourceY[i] and PatchSourceHeight[i] shall be less than the height in the luma sample units of all pictures in a layer having the same layer id as cpi_patch_layer_id[i] and to which the CPI SEI message is applied. Accordingly, the source rectangular area of each patch may not deviate from the source picture.

A variable PatchDestX[i] may be defined as cpi_patch_dest_top_left_x[i]*cpi_unit_size, and a variable PatchDestY[i] may be defined as cpi_patch_dest_top_left_y[i]*cpi_unit_size. In addition, a variable PatchDestWidth[i] may be defined as (cpi_patch_dest_width_minus1[i]+1)*cpi_unit_size, and a variable PatchDestHeight[i] may be defined as (cpi_patch_dest_height_minus1[i]+1)*cpi_unit_size.

In this case, the sum of PatchDestX[i] and PatchDestWidth[i] shall be less than the value of the above-described CompositePictureWidth. The sum of PatchDestY[i] and PatchDestHeight[i] shall be less than the value of the above-described CompositePictureHeight. Accordingly, each patch may not deviate from the composite picture.

Meanwhile, for an area covered by two or more patches, each pel value in the area may be reconstructed/regenerated based on the patch having the highest patch index i among the patches.

Two patches, in which cpi_patch_dest_top_left_x[i], cpi_patch_dest_top_left_y[i], cpi_patch_dest_width_minus1[i] and cpi_patch_dest_height_minus1[i] are respectively equal to cpi_patch_dest_top_left_x[j], cpi_patch_dest_top_left_y[j], cpi_patch_dest_width_minus1[j] and cpi_patch_dest_height_minus1[j], that is, an i-th patch and a j-th patch, shall not be present in the composite picture. Accordingly, two patches having the same position and size may not be present in the composite picture.

For two patches, that is, an i-th patch and a j-th patch, in the composite picture, when cpi_patch_dest_top_left_x[i] and cpi_patch_dest_top_left_y[i] are respectively equal to cpi_patch_dest_top_left_x[j] and cpi_patch_dest_top_left_y[j] and cpi_patch_dest_width[i] and cpi_patch_dest_height[i] are respectively greater than cpi_patch_dest_width[j] and cpi_patch_dest_height[j], patch index j shall be greater than patch index i. Therefore, when two patches having different sizes in the composite picture have the same top-left position, a patch having a smaller size may have a larger patch index, and patch areas overlapping each other may be reconstructed/reproduced based on a patch having a smaller size.

As described above, according to Embodiment 2 of the present disclosure, a gap and overlap between patches in a composite picture may be supported based on a single CPI SEI message as in the fourth to sixth examples.

Embodiment 3

According to embodiment 3 of the present disclosure, a relationship between a CPI SEI message and an output layer set (OLS) or an access unit (AU) may be defined. To this end, the following features may be applied individually or in combination of two or more.

In one embodiment, if the CPI SEI message is present in a coded video sequence (CVS), the CPI SEI message shall be present in a coded video sequence start (CVSS). Alternatively, a first SEI message present in the bitstream shall be present in a CVSS access unit (AU) (or a first access unit (AU) in the bitstream). Alternatively, the CPI SEI message may be present in any access unit (AU).

In one embodiment, when a CPI SEI message is repeated within the same access unit (AU), the content of the CPI SEI message shall be the same. Accordingly, one CPI SEI message may be substantially applied to one access unit (AU).

In one embodiment, for an access unit (AU) A containing a CPI SEI message and all AUs which follow the access unit (AU) A in output order, a composition process may be applied until one of the following is satisfied.
- the case where the next access unit (AU) in output order contains a new CPI SEI message
- the case where the next access unit (AU) is a CVSS access unit (AU)

Alternatively, in one embodiment, for an access unit (AU) A that contains a CPI SEI message and all AUs that follow the access unit (AU) A in output order, a composition process may be applied until a new CPI SEI message appears.

In one embodiment, each SEI may describe a composition process for a specific output layer set (OLS). Association between the SEI and the output layer set (OLS) may be established by signaling the SEI in a scalable nesting SEI message.

In one embodiment, when the scalable nesting SEI message includes a CPI SEI message, the scalable nesting SEI message shall be applied to an output layer set (OLS) instead of layers.

In one embodiment, if there is a CPI SEI message (or a scalable nesting SEI message including the CPI SEI message), the CPI SEI message shall be included in an access unit (AU) having a temporal Id equal to 0. Alternatively, if there is a CPI SEI message (or a scalable nesting SEI message containing the CPI SEI message), if the CPI SEI message is not a repetition of a previous CPI SEI message (i.e., if the SEI content is the same), the CPI SEI message shall be included in an AU with temporal Id equal to 0.

In one embodiment, the temporal Id value of the CPI SEI message (or the scalable nesting SEI message including the CPI SEI message) may be equal to 0.

Embodiment 3 of the present disclosure may be implemented by partially changing the semantics of the CPI SEI message described above with reference to FIG. 8. Specific examples are as follows.

6) CPI SEI Message—Seventh Example

The CPI SEI message according to the seventh example may have the same syntax structure as the CPI SEI message of the first example described above with reference to FIG. 8. In other words, the CPI SEI message of the seventh example may include syntax elements cpi_width_in_luma_samples, cpi_height_in_luma_samples, cpi_num_patches_minus1, and the like. Unless otherwise specified, semantics of each of the syntax elements may be the same as those of the first example.

However, in the case of the seventh example, unlike the case of the first example, the following constraints may be added.

If one or more CPI SEI messages are present in the bitstream, the first CPI SEI message shall be present in the CVSS Access Unit (AU). In addition, when two or more CPI SEI messages are present in one access unit (AU), the contents of the CPI SEI messages shall be the same.

When the scalable nesting SEI message includes a CPI SEI message, the value of the syntax element sn_ols_flag in the scalable nesting SEI message shall have a first value (e.g., 1) specifying that the scalable nesting SEI message is applied to specific output layer sets (OLSs).

For an access unit (AU) A that contains a CPI SEI message and all access units (AUs) that follow the access unit (AU) A in output order, the CPI SEI message may be applied until one of the following is satisfied:
- the case where it is an end of the bitstream
- the case where the next access unit (AU) contains a new CPI SEI message applied to a target output layer set (OLS)

A CPI SEI message or a scalable nesting SEI message containing the CPI SEI message shall be included in the access unit (AU) having a temporal_id equal to zero. The temporal_id of the CPI SEI message or the scalable nesting SEI message containing the CPI SEI message shall be equal to zero.

In addition, constraints of the syntax element cpi_patch_layer_id[i] applied to the first example may be changed as follows in the seventh example.

When the CPI SEI message is included in the scalable nesting SEI message, the value of cpi_patch_layer_id[i] for i in the range from 0 to cpi_num_patches_minus1 shall be the same as any one layer included in the output layer set (OLS) associated with the SEI message.

If the CPI SEI message is not included in the scalable nesting SEI message, the value of cpi_patch_layer_id [i] for i in the range from 0 to cpi_num_patches_minus1 shall be the same as any one layer present in the bitstream.

For i in the range of 0 to cpi_num_patches_minus1, a layer having a layer Id equal to cpi_patch_layer_id[i] shall be the same as any one output layer in the output layer set (OLS) associated with the SEI message.

For i in the range from 0 to cpi_num_patches_minus1, a source picture having the same layer Id as cpi_patch_layer_id [i] may not be present in an access unit (AU) to which the SEI is applied. In this case, an application generating a composite picture based on the SEI may assign a valid pel value to the i-th patch in the composite picture. Also, in this case, the application may additionally assign the same pel value as the pel value to the entire area covering the i-th patch.

Meanwhile, in the case of the seventh example, unlike the first example, constraints on cpi_patch_source_top_left_x[i]+cpi_patch_source_width_minus1[i], cpi_patch_source_top_left_y[i]+cpi_patch_source_height_minus1[i] and cpi_patch_dest_top_left_x[i]+cpi_patch_dest_width_minus1[i] may be added. The constraints are described in detail with reference to the fourth example and the fifth example.

As described above, according to Embodiment 3 of the present disclosure, a relationship between a CPI SEI message and an output layer set (OLS) or an access unit (AU) may be defined based on a single CPI SEI message as in the seventh example.

Embodiment 4

According to Embodiment 4 of the present disclosure, a composite picture may be generated based on a more compact single CPI SEI message. To this end, the following features may be applied individually or in combination of two or more.

In one embodiment, the size (i.e., width and height) of the composite picture is not signaled in the CPI SEI message, but may be derived based on the positions and sizes of patches in the composite picture. Specifically, the width of the composite picture may be derived to be a maximum value obtained by adding the widths to the horizontal positions of all patches constituting the composite picture. Also, the height of the composite picture may be derived to be a maximum value obtained by adding the heights to the vertical positions of all patches constituting the composite picture.

In one embodiment, a predetermined flag specifying whether the patch(s) of the composite picture is associated with a cropped area in the corresponding picture (i.e., source picture) may be signaled in the composite picture information SEI message. At this time, the flag may be referred to as cpi_cropped_source_area_allowed_flag.

When cpi_cropped_source_area_allowed_flag is 0, for each patch, the top-left position information of the cropped area in the corresponding picture does not need to be signaled. In this case, the top-left position may be inferred to be (0,0).

Also, when cpi_cropped_source_area_allowed_flag is 0, for each patch, size (i.e., width and height) information of the cropped area in the corresponding picture does not need to be signaled. In this case, the size of the cropped area may be inferred to be the same as the size of the corresponding picture.

Embodiment 4 of the present disclosure may be implemented by partially changing the syntax structure of the CPI SEI message described above with reference to FIG. 8. Specific examples of the CPI SEI message according to Embodiment 4 of the present disclosure are as shown in FIGS. 11 to 14.

7) CPI SEI Message—Eighth Example

Referring to FIG. 11, the CPI SEI message composite_picture_info( ) may provide information for constructing a composite picture based on one or more patches originating from pictures in an access unit (AU).

Specifically, the CPI SEI message may include syntax elements cpi_num_patches_minus1, cpi_scaling_allowed_flag, and the like. Unless otherwise specified, semantics of the syntax elements may be the same as those of the seventh example.

However, unlike the case of the seventh example, the CPI SEI message of the eighth example may not include syntax elements cpi_width_in_luma_samples and cpi_height_in_luma_samples regarding the size of the composite picture. Accordingly, in the eighth example, a process of deriving the size of a composite picture may be newly defined. A specific example thereof is shown in Table 1.

TABLE 1

The variables CompositePictureWidth and CompositePictureHeight, specifying the width and height, respectively, of the composite picture are derived as follows:
  CompositePictureWidth = cpi_patch_dest_top_left_x[ 0 ] +
  cpi_patch_dest_width_minus1[ 0 ] + 1   ...(1)
  CompositePictureHeight = cpi_patch_dest_top_left_y[ 0 ] +
  cpi_patch_dest_height_minus1[ 0 ] + 1   ...(2)
  for( i = 0; i <= cpi_num_patches_minus1; i++ ) {
    if( (cpi_patch_dest_top_left_x[ i ] +
      cpi_patch_dest_width_minus1[ i ] + 1 ) >
      CompositePictureWidth )
      CompositePictureWidth = cpi_patch_dest_top_left_x[ i ] +
      cpi_patch_dest_width_minus1[ i ] + 1   ...(3)
    if( (cpi_patch_dest_top_left_y[ i ] +
      cpi_patch_dest_height_minus1[ i ] + 1 ) >
      CompositePictureHeight )
      CompositePictureHeight = cpi_patch_dest_top_left_y[ i ] +
      cpi_patch_dest_height_minus1[ i ] + 1   ...(4)
  }

Referring to Table 1, the variable CompositePictureWidth, which represents the width of the composite picture, may be initialized to the sum (hereinafter referred to as a horizontal value) of the horizontal position (i.e., cpi_patch_dest_top_left_x[0]) and width (i.e., cpi_patch_dest_width_minus1[0]+1) of the 0-th patch according to Equation 1. In addition, the variable CompositePictureHeight, which represents the height of the composite picture, may be initialized to the sum (hereinafter, referred to as a vertical value) of the vertical position (i.e., cpi_patch_dest_top_left_y[0]) and height (i.e., cpi_patch_dest_height_minus1 [0]+1) of the 0-th patch according to Equation 2.

Also, CompositePictureWidth may be set to a maximum value among horizontal values of all patches in the composite picture according to Equation 3. Also, according to Equation 4, CompositePictureHeight may be set to a maximum value among vertical values of all patches in a composite picture.

8) CPI SEI Message—Ninth

Referring to FIG. 12, the CPI SEI message composite_picture_info( ) may provide information for constructing a composite picture based on one or more patches originating from pictures in an access unit (AU).

Specifically, the CPI SEI message may include syntax elements cpi_width_in_luma_samples, cpi_height_in_luma_samples, cpi_num_patches_minus1, cpi_scaling_allowed_flag, and the like. Unless otherwise specified, semantics of the syntax elements may be the same as those of the seventh example.

However, unlike the case of the seventh example, the CPI SEI message of the ninth example may further include a syntax element cpi_cropped_source_area_allowed_flag specifying whether the syntax elements cpi_patch_source_top_left_x[i] and cpi_patch_source_top_left_y[i] are present. The cpi_cropped_source_area_allowed_flag of a first value (e.g., 1) may specify that cpi_patch_source_top_left_x[i] and cpi_patch_source_top_left_y[i] are present in the CPI SEI message. In contrast, cpi_cropped_source_area_allowed_flag of a second value (e.g., 0) may specify that cpi_patch_source_top_left_x[i] and cpi_patch_source_top_left_y[i] are not present in the CPI SEI message.

cpi_patch_source_top_left_x[i] and cpi_patch_source_top_left_y[i] may be signaled only when cpi_cropped_source_area_allowed_flag has a first value (e.g., 1). Accordingly, the following semantics may be further added to the CPI SEI message of the ninth example.

If cpi_patch_source_top_left_x[i] is not present (e.g., cpi_cropped_source_area_allowed_flag==0), the value of cpi_patch_source_top_left_x[i] may be inferred to be 0. In addition, when cpi_patch_source_top_left_y[i] is not present (e.g., cpi_cropped_source_area_allowed_flag==0), the value of cpi_patch_source_top_left_y[i] may be inferred to be 0.

If cpi_cropped_source_area_allowed_flag has a second value (e.g., 0), the value of cpi_patch_source_width_minus1 [i] shall be equal to the value obtained by subtracting 1 from the syntax element pps_pic_width_in_luma_samples specifying the width of the picture (i.e., the source picture) associated with the composite picture. In addition, when cpi_cropped_source_area_allowed_flag has a second value (e.g., 0), the value of cpi_patch_source_height_minus1[i] shall be equal to a value obtained by subtracting 1 from the syntax element pps_pic_height_in_luma_samples specifying the height of a picture (i.e., source picture) associated with a composite picture.

9) CPI SEI Message—Tenth Example

Referring to FIG. 13, the CPI SEI message composite_picture_info( ) may provide information for constructing a composite picture based on one or more patches originating from pictures in an access unit (AU).

Specifically, the CPI SEI message may include syntax elements cpi_width_in_luma_samples, cpi_height_in_luma_samples, cpi_num_patches_minus1, cpi_scaling_allowed_flag, and the like. In addition, the CPI SEI message may further include a syntax element cpi_cropped_source_area_allowed_flag. Unless otherwise specified, semantics of the above-described syntax elements may be the same as those of the ninth example.

However, unlike the case of the ninth example, in the CPI SEI message of the tenth example, cpi_patch_source_luma_width_minus1[i] and cpi_patch_source_luma_height_minus1[i] may be signaled only when cpi_cropped_source_area_allowed_flag has a first value (e.g., 1) similarly to cpi_patch_source_top_left_x[i] and cpi_patch_source_top_left_y[i]. Accordingly, the constraints of cpi_patch_source_width_minus1[i] and cpi_patch_source_height_minus1[i] of the ninth example may be changed to the following inference rules.

When cpi_patch_source_width_minus1[i] is not present (e.g., cpi_cropped_source_area_allowed_flag==0), the value of cpi_patch_source_width_minus1[i] may be inferred to be a value obtained by subtracting 1 from the syntax element pps_pic_width_in_luma_samples specifying the width of a picture (i.e., a source picture) associated with a composite picture. In addition, if cpi_patch_source_height_minus1[i] is not present (e.g., cpi_cropped_source_area_allowed_flag==0), the value of cpi_patch_source_height_minus1[i] may be inferred to be a value obtained by subtracting 1 from the syntax element pps_pic_height_in_luma_samples specifying the height of the picture associated with the composite picture (i.e., the source picture).

As described above, according to Embodiment 4 of the present disclosure, by providing a more compact single CPI SEI message for a composite picture, it is possible to reduce the number of signaling bits and increase encoding/decoding efficiency.

Hereinafter, an image encoding/decoding method according to an embodiment of the present disclosure will be described in detail with reference to the accompanying drawings.

Figure 14:
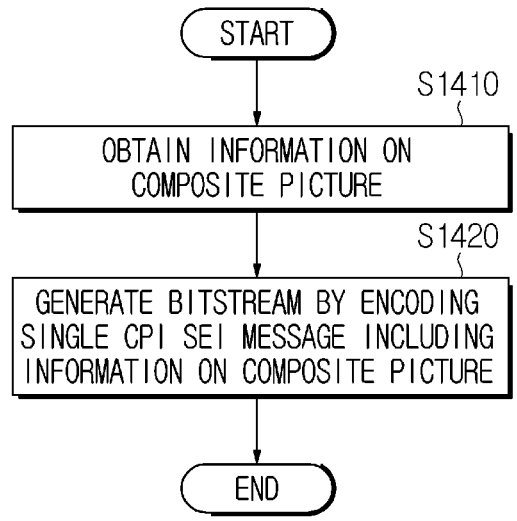
FIG. 14 is a flowchart illustrating an image encoding method according to an embodiment of the present disclosure.

FIG. 14 is a flowchart illustrating an image encoding method according to an embodiment of the present disclosure. The image encoding method of FIG. 14 may be performed by the image encoding apparatus of FIG. 2 or 5.

Referring to FIG. 14, the image encoding apparatus may derive information for a composite picture generated from one or more source pictures (S1410).

The composite picture may include one or more patches obtained from the source pictures.

In one embodiment, the composite picture includes a first patch and a second patch having the same top-left position, and the second patch may be disposed above the first patch in the composite picture, based on the first patch completely covering the second patch.

In one embodiment, based on two or more of the patches having an overlapping area in the composite picture, the overlapping area may be reconstructed (or reproduced) based on a patch having the highest patch index among the two or more patches.

The information for the composite picture may include first information of a source area corresponding to each of the patches in the source pictures and second information of a patch area covered by each of the patches in the composite picture.

In one embodiment, the first information may include a layer identifier (e.g., cpi_patch_layer_id[i]) of a layer including a source picture for each of the patches.

In one embodiment, the first information may include a second flag specifying whether the source area is associated with a cropped area in the source picture. In addition, based on the second flag specifying that the source area is associated with a cropped area in the source picture, the first information may further include a position of the source area.

In an embodiment, the second information may include a first flag (e.g., cpi_gap_allowed_flag) specifying whether the patches cover all areas of the composite picture. Based on the first flag specifying that the patches do not cover all areas of the composite picture (e.g., cpi_gap_allowed_flag==1), pels of areas not covered by the patches in the composite picture may be initialized to a predetermined valid pel value.

In one embodiment, the size of the composite picture may be derived based on the position (e.g., cpi_patch_dest_top_left_x[i], cpi_patch_dest_top_left_y[i]) and size (e.g., cpi_patch_dest_width_minus1[i], cpi_patch_dest_height_minus1[i]) of the patch area included in the second information.

Each layer including the source pictures may be an output layer.

The image encoding apparatus may generate a bitstream by encoding a single composite picture information (CPI) supplemental enhancement information (SEI) message including information for the composite picture (S1420).

In one embodiment, the bitstream may have a single layer structure. Alternatively, the bitstream may have a multi-layer structure.

In one embodiment, the CPI SEI message may be included in a scalable nesting SEI message. In this case, the scalable nesting SEI message may be applied to an output layer set associated with the CPI SEI message.

Figure 15:
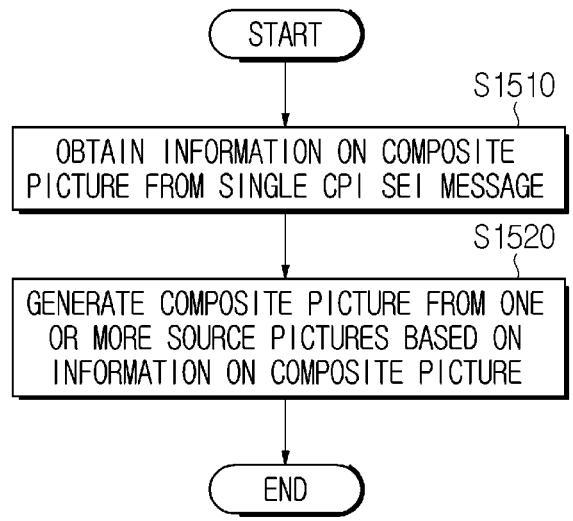
FIG. 15 is a flowchart illustrating an image decoding method according to an embodiment of the present disclosure.

FIG. 15 is a flowchart illustrating an image decoding method according to an embodiment of the present disclosure. The image decoding method of FIG. 15 may be performed by the image decoding apparatus of FIG. 3 or 6.

Referring to FIG. 15, the image decoding apparatus may obtain information for a composite picture from a single composite picture information (CPI) supplemental enhancement information (SEI) message (S1510).

The information for the composite picture may include first information of a source area corresponding to each of the patches in the source pictures and second information of a patch area covered by each of the patches in the composite picture. Specific examples of the first information and the second information are described above with reference to FIG. 14.

Each layer including the source pictures may be an output layer.

Also, the image decoding apparatus may generate the composite picture from one or more source pictures based on the information for the composite picture (S1520).

The composite picture may include one or more patches obtained from the source pictures. The source picture may include a packed picture or a projected picture obtained in the process of processing a 360 video. Also, the patches may include subpictures, tiles/tile groups, or rectangular slices.

In one embodiment, based on two or more of the patches having an overlapping area in the composite picture, the overlapping area may be reconstructed (or reproduced) based on a patch having the highest patch index among the two or more patches.

According to the image encoding/decoding method according to an embodiment of the present disclosure described above with reference to FIGS. 14 and 15, since a composite picture may be generated based on a single CPI SEI message, complexity can be reduced. In addition, a composite picture may be generated from a source picture belonging to a single layer as well as multiple layers. Also, a composite picture may be generated based on one or more patches corresponding to a partial area in a source picture. In addition, as information for a layer to which each patch belongs is signaled in the CPI SEI message, parsing dependency on a video parameter set (VPS) can be removed. Also, a composite picture can be generated only from a source picture belonging to an output layer.

According to the image encoding/decoding method according to an embodiment of the present disclosure, a gap and overlap between patches in a composite picture may be supported based on a single CPI SEI message. Also, based on a single CPI SEI message, a relationship between a CPI SEI message and an output layer set (OLS) or an access unit (AU) may be defined. In addition, by providing a more compact single CPI SEI message for a composite picture, the number of signaling bits can be reduced and encoding/decoding efficiency can be increased.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, if it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

In addition, the image decoding apparatus and the image encoding apparatus, to which the embodiments of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an OTT video (over the top video) device, an Internet streaming service providing device, a three-dimensional (3D) video device, a video telephony video device, a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

Figure 16:
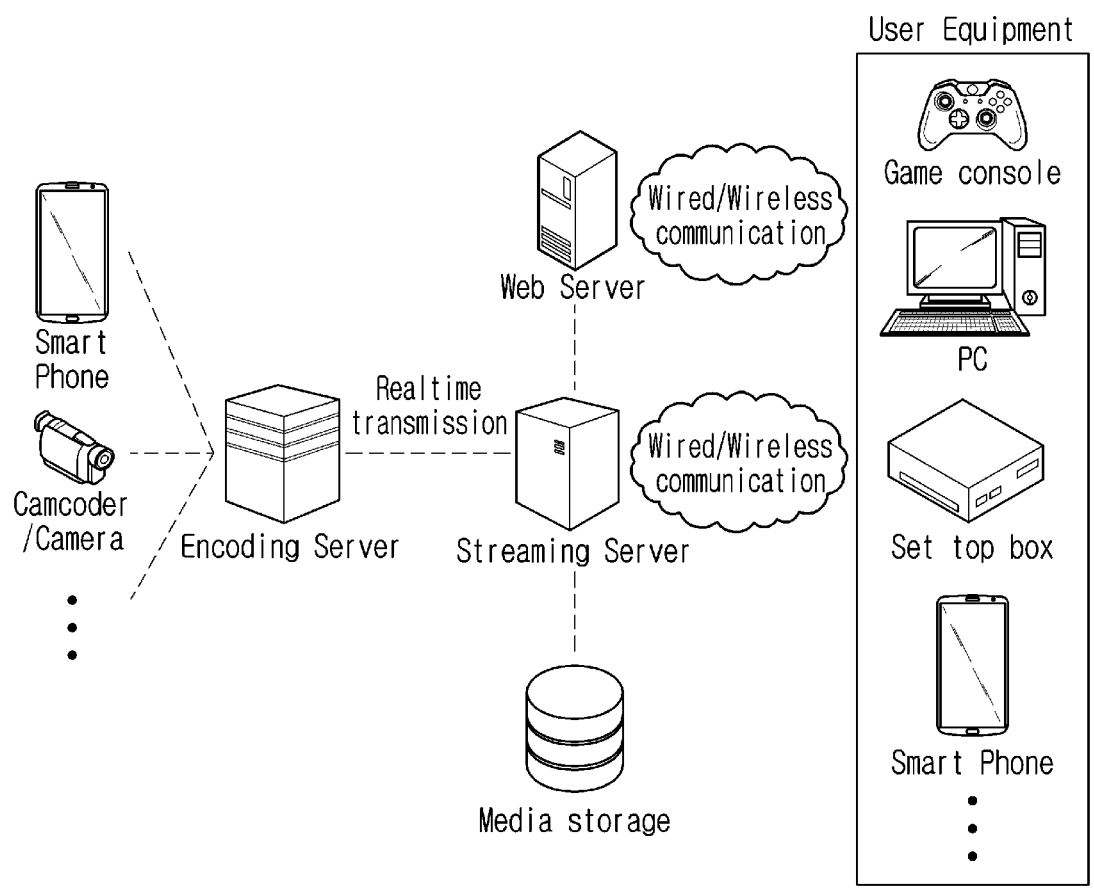
FIG. 16 is a view showing a content streaming system, to which an embodiment of the present disclosure is applicable.

FIG. 16 is a view showing a content streaming system, to which an embodiment of the present disclosure is applicable.

As shown in FIG. 16, the content streaming system, to which the embodiment of the present disclosure is applied, may largely include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the content streaming system may be operated as a distributed server, in which case data received from each server may be distributed.

Figure 17:
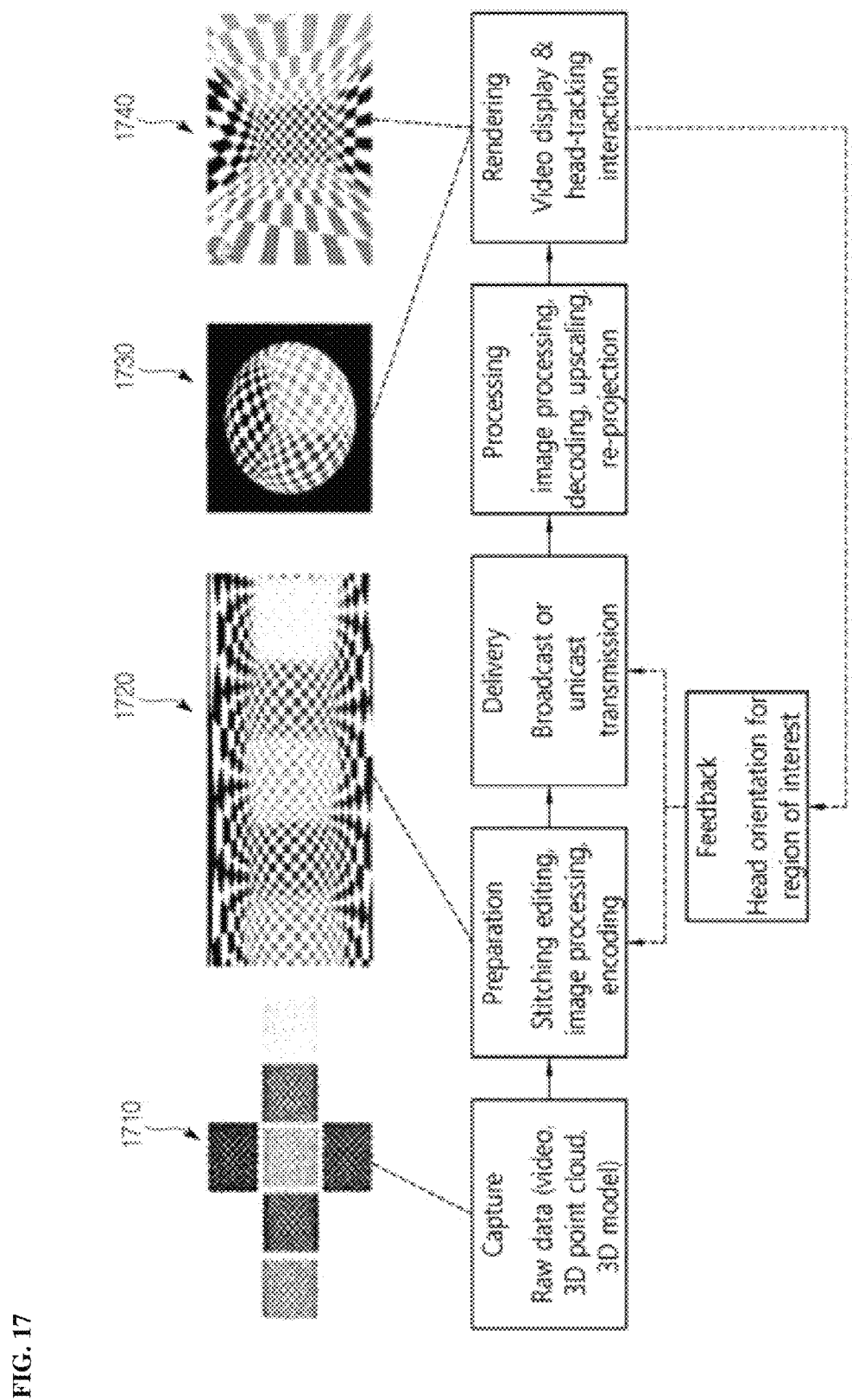
FIG. 17 is a view schematically illustrating architecture for providing a three-dimensional image/video service in which embodiment(s) of the present disclosure may be utilized.

FIG. 17 is a view schematically illustrating architecture for providing a three-dimensional image/video service in which embodiment(s) of the present disclosure may be utilized. FIG. 17 may illustrate a 360-degree or omnidirectional video/image processing system. In addition, the system of FIG. 17 may be, for example, implemented in an extended reality (XR) supporting apparatus. That is, the system may provide a method of providing virtual reality to a user.

Extended reality collectively refers to virtual reality (VR), augmented reality (AR) and mixed reality (MR). VR technology provides only a CG image of objects or backgrounds of a real world, AR technology provide virtually created CG images on an image of real objects, and MR technology is computer graphic technology for mixing, combining and providing virtual objects in a real world.

MR technology is similar to AR technology in that real objects and virtual objects are displayed together. However, virtual objects are used to complement real objects in AR technology, whereas virtual objects and real objects are used with the equal characteristics in MR technology.

XR technology is applicable to head-mount display (HMD), head-up display (HUD), cellular phones, tablet PCs, laptops, desktops, TVs, digital signages, etc., and a device, to which XR technology is applied, may be referred to as an XR device. The XR device may include a first digital device and/or a second digital device, which will be described below.

360-content means overall content for implementing and providing VR, and may include a 360-degree video and/or a 360-degree audio. A 360-degree video may mean a video or image content simultaneously captured or played in all directions (360 degrees or less), which is necessary to provide VR. Hereinafter, a 360 video may mean a 360-degree video. A 360-degree audio is also audio content for providing VR and may mean spatial audio content which enables a sound source to be recognized as being located in a specific three-dimensional space. 360-degree content may be generated, processed and transmitted to users, and users may consume VR experience using 360-degree content. A 360-degree video may be referred to as an omnidirectional video, and a 360-degree image may be referred to as an omnidirectional image. Hereinafter, the 360-degree video will be focused upon and the embodiment(s) of the present disclosure are not limited to VR and may include processing of video/image content such as AR or MR. The 360-degree video may mean a video or image displayed in 3D spaces having various shapes according to the 3D model, and, for example, the 360-degree video may be displayed on a spherical surface.

The present method particularly proposes a method of efficiently providing a 360-degree video. In order to provide the 360-degree video, first, the 360-degree video may be captured through one or more cameras. The captured 360-degree video may be transmitted through a series of processes and data received by a receiver may be processed to an original 360-degree video and rendered. Therefore, the 360-degree video may be provided to the user.

Specifically, the overall process for providing the 360-degree video may include a capture process, a preparation process, a delivery process, a processing process, a rendering process and/or a feedback process.

The capture process may mean a process of capturing an image or video at a plurality of views through one or more cameras. Image/video data shown in 1710 of FIG. 17 may be generated by the capture process. Each plane of 1710 of FIG. 17 may mean an image/video at each view. The plurality of captured image/video may be referred to as raw data. Metadata related to capture may be generated in the capture process.

For capture, special cameras for VR may be used. In some embodiments, when a 360-degree video for a virtual space generated by a computer is provided, capture through a real camera may not be performed. In this case, the capture process may be replaced simply by the process of generating related data.

The preparation process may be a process of processing the captured image/video and metadata generated in the capture process. The captured image/video may be subjected to a stitching process, a projection process, a region-wise packing process and/or an encoding process in the preparation process.

First, each image/video may be subjected to a stitching process. The stitching process may be a process of generating one panorama image/video or a spherical image/video by connecting captured images/videos.

Thereafter, the stitched image/video may be subjected to the projection process. In the projection process, the stitched image/video may be projected on a 2D image. This 2D image may be referred to as a 2D image frame according to the context. Projecting on a 2D image may be expressed as mapping to a 2D image. The projected image/video data may have the form of a 2D image shown in 1720 of FIG. 17.

Video data projected on the 2D image may be subjected to the region-wise packing process, in order to increase video coding efficiency. Region-wise packing may mean a process of dividing the video data projected on the 2D image according to the region and processing the video data. Here, the region may mean a region in which the 2D image, on which the 360-degree video data is projected, is divided. These regions may be obtained by equally or arbitrarily dividing the 2D image according to the embodiment. In addition, in some embodiments, the regions may be divided according to the projection scheme. The region-wise packing process is optional and may be omitted in the preparation process.

In some embodiments, this processing process may include a process of rotating each region or rearranging each region on the 2D image in order to increase video coding efficiency. For example, by rotating the regions such that specific sides of the regions are located close to each other, it is possible to increase coding efficiency.

In some embodiments, this processing process may include a process of increasing or decreasing resolution of a specific region, in order to differentiate resolution for each region on the 360-degree video. For example, resolution of regions corresponding to relatively more important areas on the 360-degree video may be higher than that of the other regions. The video data projected on the 2D image or the region-wise packed video data may be subjected to the encoding process through a video codec.

In some embodiments, the preparation process may further include an editing process. In the editing process, editing of the image/video data before/after projection may be further performed. Even in the preparation process, similarly, metadata on stitching/projection/encoding/editing may be generated. In addition, metadata on an initial view of video data projected on the 2D image or region of interest (ROI) may be generated.

The delivery process may be a process of processing and delivering the image/video data and metadata subjected to the preparation process. For delivery, processing according to an arbitrary delivery process may be performed. Data processed for delivery may be delivered through a broadcast network and/or broadband. This data may be delivered to the receiver in an on-demand manner. The receiver may receive data through various paths.

The processing process may mean a process of decoding the received data and reprojecting the projected image/video data on a 3D model. In this process, the image/video data projected on the 2D images may be reprojected in the 3D space. This process may be referred to as mapping or projection according to the context. In this case, the 3D space may have a shape which varies according to the 3D model. For example, the 3D model may include a sphere, a cube, a cylinder or a pyramid.

In some embodiments, the processing process may further include an editing process, an up-scaling process, etc. In this editing process, editing of the image/video data before/after reprojection may be further performed. When the image/video data is reduced, the size thereof may increase through up-scaling of samples in the up-scaling process. If necessary, operation of reducing the size through down-scaling may be performed.

The rendering process may mean a process of rendering and displaying the image/video data reprojected in the 3D space. In some expressions, reprojection and rendering may be collectively expressed as rendering on a 3D model. An image/video reprojected on the 3D model (or rendered on the 3D model) may have the shape shown in 1730 of FIG. 17. 1730 of FIG. 17 illustrates reprojection on a spherical 3D model. A user may view a partial area of the rendered image/video through a VR display. In this case, an area viewed by the user may have a shape shown in 1740 of FIG. 17.

The feedback process may mean a process of delivering a variety of feedback information capable of being obtained in the display process to a transmitter. Through the feedback process, interactivity may be provided in 360-degree video consumption. In some embodiments, head orientation information and viewport information indicating an area currently viewed by a user may be delivered to the transmitter in the feedback process. In some embodiments, the user may interact with those implemented in the VR environment. In this case, information related to interaction may be delivered to the transmitter or a service provider in the feedback process. In some embodiments, the feedback process may not be performed.

The head orientation information may mean information on the position, angle and motion of the head of the user. Based on this information, information on an area currently viewed by the user in the 360-degree video, that is, viewport information, may be computed.

The viewport information may be information on an area currently viewed by the user in the 360-degree video. Through this, gaze analysis may be performed to determine how the user consumes the 360-degree video or how much the user gazes a certain area of the 360-degree video. Gaze analysis may be performed by the receiver and delivered to the transmitter through a feedback channel. A device such as a VR display may extract a viewport area based on the position/direction of the head of the user, vertical or horizontal field of view (FOY) information supported by the device, etc.

Meanwhile, the 360-degree video/image may be processed based on a subpicture. A projected picture or packed picture including a 2D image may be divided into subpictures and processed in units of subpictures. For example, high resolution may be provided to specific subpicture(s) according to the user viewport or only specific subpicture(s) may be encoded and signaled to a reception device (a decoding device). In this case, the decoding device may receive a subpicture bitstream, reconstruct/decode the specific subpicture(s) and perform rendering according to the user viewport.

In some embodiments, the above-described feedback information may not only be delivered to the transmitter, but may also be consumed in the receiver. That is, decoding, reprojection and rendering process of the receiver may be performed using the above-described feedback information. For example, only the 360-degree video for the area currently viewed by the user may be preferentially decoded and rendered using the head orientation information and/or the viewport information.

Here, viewport or viewport area may mean an area viewed by the user in the 360-degree video. Viewpoint may be a point viewed by the user in the 360-degree video and may mean a center point of the viewport area. That is, the viewport is an area centered on the viewpoint and the size and shape of the area may be determined by the field of view (FOY).

In the entire architecture for providing the 360-degree video, the image/video data subjected to a series of processes such as capture/projection/encoding/delivery/decoding/reprojection/rendering may be referred to as 360-degree video data. The term 360-degree video data may include metadata or signaling information related to such image/video data.

In order to store and transmit media data such as audio or video, a standardized media file format may be defined. In some embodiments, a media file may have a file format based on ISO base media file format (BMFF).

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

INDUSTRIAL APPLICABILITY

The embodiments of the present disclosure may be used to encode or decode an image.

What is claimed is:

1. An image encoding method performed by an image encoding apparatus, the image encoding method comprising:
   deriving information for a composite picture generated from one or more source pictures; and
   generating a bitstream by encoding a single composite picture information (CPI) supplemental enhancement information (SEI) message including the information for the composite picture,
   wherein the composite picture comprises one or more patches obtained from the source pictures,
   wherein the information for the composite picture comprises first information for a source area corresponding to each of the patches in the source pictures and second information for a patch area covered by each of the patches in the composite picture, and
   wherein each layer including the source pictures is an output layer.

2. The image encoding method of claim 1, wherein the bitstream has a single layer structure.

3. The image encoding method of claim 1, wherein the first information comprises a layer identifier of a layer including a source picture for each of the patches.

4. The image encoding method of claim 1, wherein the second information comprises a first flag specifying whether the patches cover all areas of the composite picture.

5. The image encoding method of claim 4, wherein, based on the first flag specifying that the patches do not cover all areas of the composite picture, pels of an area not covered by the patches in the composite picture are initialized to a predetermined valid pel value.

6. The image encoding method of claim 1, wherein, based on the composite picture including a first patch and a second patch which have the same top-left position, and the first patch completely covering the second patch, the second patch is disposed above the first patch in the composite picture.

7. The image encoding method of claim 1, wherein, based on two or more of the patches having an overlapping area in the composite picture, the overlapping area is reconstructed based on a patch having the highest patch index among the two or more patches.

8. The image encoding method of claim 1, wherein the CPI SEI message is included in a scalable nesting SEI message.

9. The image encoding method of claim 8, wherein the scalable nesting SEI message is applied to an output layer set associated with the CPI SEI message.

10. The image encoding method of claim 1, wherein a size of the composite picture is derived based on a position and a size of the patch area, the position and the size of the patch area being included in the second information.

11. The image encoding method of claim 1,
wherein the first information comprises a second flag specifying whether the source area is associated with a cropped area in a source picture, and
wherein the first information further comprises a position of the source area based on a value of the second flag.

12. A method of transmitting a bitstream, the method comprising:
deriving information for a composite picture generated from one or more source pictures;
generating a bitstream by encoding a single composite picture information (CPI) supplemental enhancement information (SEI) message including the information for the composite picture; and
transmitting the bitstream,
wherein the composite picture comprises one or more patches obtained from the source pictures,
wherein the information for the composite picture comprises first information for a source area corresponding to each of the patches in the source pictures and second information for a patch area covered by each of the patches in the composite picture, and
wherein each layer including the source pictures is an output layer.

13. An image encoding apparatus comprising a memory and at least one processor,
wherein the at least one processor is configured to:
derive information for a composite picture generated from one or more source pictures; and
generate a bitstream by encoding a single composite picture information (CPI) supplemental enhancement information (SEI) message including the information for the composite picture,
wherein the composite picture comprises one or more patches obtained from the source pictures,
wherein the information for the composite picture comprises first information for a source area corresponding to each of the patches in the source pictures and second information for a patch area covered by each of the patches in the composite picture, and
wherein each layer including the source pictures is an output layer.

14. An image decoding method performed by an image decoding apparatus, the image decoding method comprising:
obtaining information for a composite picture from a single composite picture information (CPI) supplemental enhancement information (SEI) message; and
generating the composite picture from one or more decoded pictures based on the information for the composite picture,
wherein the composite picture comprises one or more patches obtained from the decoded pictures,
wherein the information for the composite picture comprises first information for a source area corresponding to each of the patches in the decoded pictures and second information for a patch area covered by each of the patches in the composite picture, and
wherein each layer including the decoded pictures is an output layer.

15. The image decoding method of claim 14, wherein, based on two or more of the patches having an overlapping area in the composite picture, the overlapping area is reconstructed based on a patch having the highest patch index among the two or more patches.

* * * * *